US012747965B2

(12) United States Patent
Kang et al.

(10) Patent No.: US 12,747,965 B2
(45) Date of Patent: Sep. 29, 2026

(54) SENSOR AND DISPLAY PANEL AND ELECTRONIC DEVICE

(71) Applicant: Samsung Electronics Co., Ltd., Suwon-si (KR)

(72) Inventors: Hyun Bum Kang, Suwon-si (KR); Gae Hwang Lee, Suwon-si (KR); Hyung Jun Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 157 days.

(21) Appl. No.: 18/910,401

(22) Filed: Oct. 9, 2024

(65) Prior Publication Data

US 2025/0224257 A1 Jul. 10, 2025

(30) Foreign Application Priority Data

Jan. 9, 2024 (KR) ........................ 10-2024-0003810
Oct. 2, 2024 (KR) ........................ 10-2024-0134125

(51) Int. Cl.
*G01D 5/16* (2006.01)
*G01D 5/14* (2006.01)
*G06F 3/041* (2006.01)
*G06F 3/045* (2006.01)

(52) U.S. Cl.
CPC ..................................... *G01D 5/16* (2013.01)

(58) Field of Classification Search
CPC .. G01D 5/14; G01D 5/16; G06F 3/041; G06F 3/045
See application file for complete search history.

(56) References Cited

U.S. PATENT DOCUMENTS 10,090,479 B2 10/2018 Kim et al.
10,424,750 B2 9/2019 Lu
2021/0153347 A1 5/2021 Renshaw et al.
2022/0192549 A1 6/2022 Khan et al.
2023/0260439 A1 8/2023 Lee et al.

FOREIGN PATENT DOCUMENTS

KR 2022-0080663 A 6/2022
KR 102412809 B1 * 6/2022 .............. G01L 5/10
KR 10-2560712 B1 7/2023
KR 2023-0102447 A 7/2023

* cited by examiner

*Primary Examiner* — Neel D Shah

(74) *Attorney, Agent, or Firm* — Harness, Dickey & Pierce, P.L.C.

(57) ABSTRACT

A sensor includes a first electrode and a second electrode, each including a conductive polymer and having different work functions from each other, and a photoactive layer between the first electrode and the second electrode and including a first semiconductor and a second semiconductor having different electrical properties from each other, and an elastomer, wherein each of an elongation rate of the first electrode, an elongation rate of the second electrode, and an elongation rate of the photoactive layer is greater than about 50%, wherein each respective elongation rate is a percentage of a change in length from an initial length to a breaking point.

20 Claims, 10 Drawing Sheets

SENSOR AND DISPLAY PANEL AND ELECTRONIC DEVICE

CROSS-REFERENCE TO RELATED APPLICATIONS

This application claims priority to and the benefit of Korean Patent Application No. 10-2024-0003810 filed in the Korean Intellectual Property Office on Jan. 9, 2024, and Korean Patent Application No. 10-2024-0134125 filed in the Korean Intellectual Property Office on Oct. 2, 2024, the entire contents of each of which are incorporated herein by reference.

BACKGROUND

1. Field

Example embodiments of the inventive concepts are directed to sensors, display panels, and electronic devices.

2. Description of the Related Art

Recently, research has been conducted on attachable devices that directly attach devices such as display panels or smart skin devices, soft robots, and biomedical devices to objects, skin, or clothes.

SUMMARY

These attachable devices require stretchability that can flexibly respond to the shape of an object or the movement of a living body, and restoration that can be restored to its original state.

Some example embodiments provide a sensor that may implement high stretchability and restoration without deteriorating performance.

Some example embodiments provide a display panel including the sensor.

Some example embodiments provide an electronic device including the sensor or the display panel.

According to some example embodiments, a sensor may include a first electrode and a second electrode, the first electrode and the second electrode each including a conductive polymer and having different work functions from each other, and a photoactive layer between the first electrode and the second electrode. The photoactive layer may include a first semiconductor and a second semiconductor having different electrical properties from each other, and an elastomer. Each of an elongation rate of the first electrode, an elongation rate of the second electrode, and an elongation rate of the photoactive layer is greater than about 50%, wherein each respective elongation rate is a percentage of a change in length from an initial length to a breaking point.

Each of the elongation rate of the first electrode and the elongation rate of the second electrode may be higher than an elongation rate of the conductive polymer.

Each of the elongation rate of the first electrode and the elongation rate of the second electrode is about 1.2 times to about 10 times higher than the elongation rate of the conductive polymer, and the elongation rate of the photoactive layer is about 1.2 times to about 10 times higher than each of an elongation rate of the first semiconductor, an elongation rate of the second semiconductor, or any combination thereof.

A work function of the first electrode may be shallower than a work function of the conductive polymer and a work function of the second electrode may be deeper than a work function of the conductive polymer.

At least one of the first electrode or the second electrode may further include a polymer additive that is different from the conductive polymer.

The first electrode may include a first polymer additive having a shallower work function than the conductive polymer and the second electrode may include a second polymer additive having a deeper work function than the conductive polymer.

The first electrode may include a first layer including the conductive polymer, and a second layer including the first polymer additive and in contact with the photoactive layer.

The second electrode may include a mixture of the conductive polymer and the second polymer additive.

The first polymer additive may include a substituted or unsubstituted ethyleneimine moiety, a polymer including a substituted or unsubstituted fluorene moiety, a polymer including a substituted or unsubstituted naphthalene diimide moiety, a copolymer thereof, or any combination thereof.

The second polymer additive may include a fluorine-containing ionomer.

Each of the first electrode and the second electrode may further include a surfactant.

The conductive polymer may include PEDOT: PSS or a derivative thereof.

Each resistance change rate of the first electrode and the second electrode may be less than about 5% when stretched 100 times at 50% strain.

At least one of the first semiconductor or the second semiconductor may be a polymer semiconductor, and the elastomer may be styrene-ethylene-butylene-styrene (SEBS), styrene-ethylene-propylene-styrene (SEPS), styrene-butadiene-styrene (SBS), styrene-isobutylene-styrene (SIBS), or any combination thereof.

A content of the elastomer included in the photoactive layer may be equal to or greater than a content of the first semiconductor included in the photoactive layer or a content of the second semiconductor included in the photoactive layer.

According to some example embodiments, a display panel may include a stretchable substrate, the sensor on the stretchable substrate, and a light emitting diode on the stretchable substrate.

The stretchable substrate may include a stretchable region and a non-stretchable region, the sensor may be in the stretchable region, and the light emitting diode may be in the non-stretchable region.

The stretchable substrate may include a stretchable polymer, and the non-stretchable region may include a non-stretchable polymer having an elastic modulus more than 100 times higher than that of the stretchable polymer.

According to some example embodiments, an electronic device including the sensor or the display panel may be provided.

High stretchability and restoration may be achieved without deteriorating sensor performance. Accordingly, the reliability and/or durability of the sensor and/or device including same may be improved, and thus a functionality of the sensor and/or device including same may be improved.

DETAILED DESCRIPTION

Figure 1:
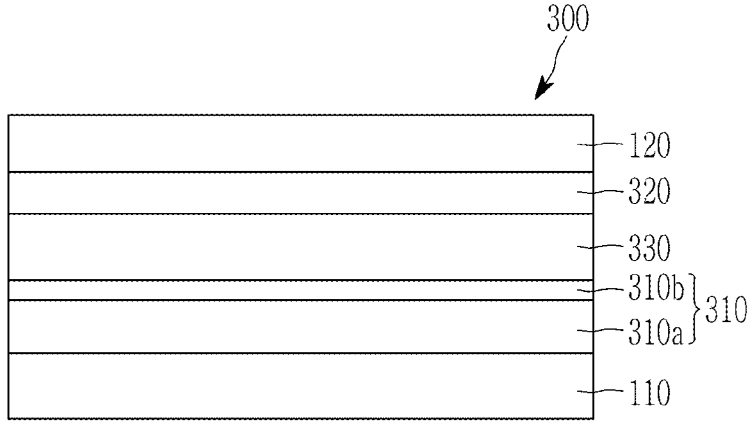
FIG. 1 is a cross-sectional view schematically showing an example of a sensor according to some example embodiments.

Hereinafter, example embodiments are described in detail so that those skilled in the art may easily implement them. However, the actual applied structure may be implemented in various different forms and is not limited to the implementations described herein.

In the drawings, the thickness of layers, films, panels, regions, etc., are exaggerated for clarity.

It will be understood that when an element such as a layer, film, region, or substrate is referred to as being "on" another element, it may be directly on the other element or intervening elements may also be present. In contrast, when an element is referred to as being "directly on" another element, there are no intervening elements present.

It will be understood that elements and/or properties thereof (e.g., structures, surfaces, directions, or the like), which may be referred to as being "perpendicular," "parallel," "coplanar," or the like with regard to other elements and/or properties thereof (e.g., structures, surfaces, directions, or the like) may be "perpendicular," "parallel," "coplanar," or the like or may be "substantially perpendicular," "substantially parallel," "substantially coplanar," respectively, with regard to the other elements and/or properties thereof. Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%)

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%). Elements and/or properties thereof (e.g., structures, surfaces, directions, or the like) that are "substantially coplanar" with regard to other elements and/or properties thereof will be understood to be "coplanar" with regard to the other elements and/or properties thereof within manufacturing tolerances and/or material tolerances and/or have a deviation in magnitude and/or angle from "coplanar," or the like with regard to the other elements and/or properties thereof that is equal to or less than 10% (e.g., a. tolerance of ±10%). It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same. It will be understood that elements and/or properties thereof described herein as being the "substantially" the same and/or identical encompasses elements and/or properties thereof that have a relative difference in magnitude that is equal to or less than 10%.

As used herein, when a definition is not otherwise provided, "substituted" refers to replacement of hydrogen of a compound by a substituent selected from a halogen atom, a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a silyl group, a C1 to C20 alkyl group, a C2 to C20 alkenyl group, a C2 to C20 alkynyl group, a C6 to C30 aryl group, a C7 to C30 arylalkyl group, a C1 to C30 alkoxy group, a C1 to C20 heteroalkyl group, a C3 to C20 heteroaryl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, and any combination thereof.

As used herein, when a definition is not otherwise provided, "aryl group" refers to a group including at least one hydrocarbon aromatic moiety. All elements of the hydrocarbon aromatic moiety have p-orbitals which form conjugation, for example a phenyl group, a naphthyl group, and the like, two or more hydrocarbon aromatic moieties may be linked by a sigma bond and may be, for example a biphenyl group, a terphenyl group, a quarterphenyl group, and the like, and two or more hydrocarbon aromatic moieties may be fused directly or indirectly to provide a non-aromatic fused ring, for example a fluorenyl group. The aryl group may include a monocyclic, polycyclic or fused polycyclic (i.e., rings sharing adjacent pairs of carbon atoms) functional group.

As used herein, when a definition is not otherwise provided, "heterocyclic group" may be a C2 to C30 heterocyclic group. The heterocyclic group refers to a cyclic group including 1 to 3 heteroatoms selected from N, O, S, Se, Te, P, and Si instead of carbon atom(s) in a cyclic group selected from an arene group (e.g., a C6 to C30 arene group, a C6 to C20 arene group, or a C6 to C10 arene group), an alicyclic hydrocarbon ring group (e.g., a C3 to C30 cycloalkyl group, a C3 to C20 cycloalkyl group, or a C3 to C10 cycloalkyl group), or a fused ring thereof. At least one carbon atom of the heterocyclic group may also be substituted with a thiocarbonyl group (C═S).

As used herein, when a definition is not otherwise provided, "aromatic hydrocarbon group" includes a phenyl group, a naphthyl group, a C6 to C30 aryl group, a C6 to C30 arylene group, but is not limited thereto.

As used herein, when a definition is not otherwise provided, "fused ring" is a fused ring of two or more substituted or unsubstituted C5 to C30 hydrocarbon cyclic groups, a fused ring of two or more substituted or unsubstituted C2 to C30 heterocyclic groups, or a fused ring of a substituted or unsubstituted C5 to C30 hydrocarbon cyclic group and a substituted or unsubstituted C2 to C30 heterocyclic group (e.g., a fluorenyl group). Herein, the hydrocarbon cyclic group and the hetero cyclic group are as defined above.

As used herein, when a definition is not otherwise provided, "hetero" refers to one including 1 to 4 heteroatoms selected from N, O, S, Se, Te, Si, and P.

As used herein, when a definition is not otherwise provided, "heteroaryl group" refers to an aryl group containing at least one hetero atom selected from N, O, S, Se, Te, P and Si instead of carbon (C) in the aromatic ring. When the heteroaryl group is a fused ring, each aromatic ring may have at least one heteroatom. Examples of the heteroaryl groups may include a heteropyrrolyl group, a pyrazolyl group, an imidazolyl group, an oxazolyl group, an isoxazolyl group, a thiazolyl group. group, an isothiazolyl group, a pyridinyl group, a pyridazinyl group, a pyrimidinyl group, a pyrazinyl group, an indolyl group, a quinolinyl group, an isoquinolinyl group, a naphthyridinyl group, a cinnolinyl group, a quinazolinyl group, a phthalazinyl group, a benzotriazinyl group, a pyridopyrazinyl group, a pyridopyrimidinyl group, a pyridopyridazinyl group, a thienyl group, a benzothienyl group, a selenophenyl group, or a benzoselenophenyl group.

As used herein, when a definition is not otherwise provided, "cycloalkyl group" refers to an alicyclic cyclic group, for example, a C3 to C30 cycloalkyl group or a C3 to C20 cycloalkyl group.

As used herein, when a definition is not otherwise provided, "heterocycloalkyl group" refers to a cycloalkyl group containing at least one heteroatom selected from N, O, S, Se, Te, P, and Si instead of carbon (C) in the alicyclic ring. That is, it means that some of the hydrogen atoms of the cycloalkyl group are substituted with an alkyl group, but contain a heteroatom. Examples of the cycloalkyl groups may include an aziridinyl group, a pyrrolidinyl group, a piperidinyl group, a piperazinyl group, a morpholinyl group, a thiomorpholinyl group, a tetrahydrofuranyl group, a tetrahydrothiofuranyl group, a tetrahydropyranyl group, and a pyranyl group.

As used herein, "alkyl group" refers to a monovalent linear or branched saturated hydrocarbon group, for example, a methyl group, an ethyl group, a propyl group, an isopropyl group, an n-butyl group, an isobutyl group, a t-butyl group, a pentyl group, a hexyl group, and the like.

As used herein, when a definition is not otherwise provided, "alkoxy group" refers to a group represented by-OR, wherein R may be the alkyl group described above.

As used herein, when a definition is not otherwise provided, "ester group" refers to a group represented by-C(═O)OR, wherein R is a C1 to C20 alkyl group or a C6 to C20 aryl group.

As used herein, when a definition is not otherwise provided, "combination" refers to a mixture, a stack, or an alloy of constituting components. As used herein, when a definition is not otherwise provided, "combination thereof" in the definition of chemical formula refers to at least two substituents bound to each other by a single bond or a C1 to C10 alkylene group, or at least two fused substituents.

As used herein, "substantially" includes an approximate range taking into account variations and errors within a normal range, for example, about ±5%, ±4%, ±3%, ±2%, or ±1%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof. When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

Hereinafter, the term "combination" includes a mixture, or a laminate structure of two or more.

Hereinafter, when a definition is not otherwise provided, a work function or an energy level is expressed as an absolute value from a vacuum level. In addition, when the work function or the energy level is referred to be deep, high, or large, it may have a large absolute value based on "0 eV" of the vacuum level while when the work function or the energy level is referred to be shallow, low, or small, it may have a small absolute value based on "0 eV" of the vacuum level. Further, the differences between the work function and/or the energy level may be values obtained by subtracting a small value of the absolute value from a large value of the absolute value.

Hereinafter, when a definition is not otherwise provided, the work function is measured using UV photoelectron spectroscopy (UPS).

A HOMO energy level is evaluated by irradiating UV light to the thin film with AC-3 (Riken Keiki Co., Ltd.) to measure a dose of photoelectrons emitted according to energy. Hereinafter, when a definition is not otherwise provided, the LUMO energy level may be obtained by obtaining an energy bandgap using a UV-Vis spectrometer (Shimadzu Corporation), and then calculating the LUMO energy level from the energy bandgap and the already measured HOMO energy level.

Hereinafter, a sensor according to some example embodiments will be described.

FIG. 1 is a cross-sectional view schematically showing an example of a sensor according to some example embodiments.

Referring to FIG. 1, a sensor 300 according to some example embodiments includes a lower substrate 110, an upper substrate 120, a first electrode 310, a second electrode 320, and a photoactive layer 330.

One of the lower substrate 110 or the upper substrate 120 may be a support substrate and the other may be an encapsulation substrate. For example, the lower substrate 110 may be a support substrate and the upper substrate 120 may be an encapsulation substrate. For example, the upper substrate 120 may be a support substrate and the lower substrate 110 may be an encapsulation substrate.

The lower substrate 110 and the upper substrate 120 may each be a stretchable substrate that may be stretched in a particular (or, alternatively, predetermined) direction and restored. The stretchable substrate may flexibly respond to external forces or external movements such as twisting, pressing, or pulling in a particular (or, alternatively, predetermined) direction. The stretchable substrate may include a stretchable material (e.g., a stretchable polymer), and the stretchable material may include a polymer elastomer, an organic-inorganic elastomer, an inorganic elastomer-like material, or any combination thereof. The polymer elastomer or the organic-inorganic elastomer may include, for example, a substituted or unsubstituted polyorganosiloxane such as polydimethylsiloxane (PDMS), a polymer elastomer including a substituted or unsubstituted butadiene moiety such as styrene-ethylene-butylene-styrene (SEBS), a polymer elastomer including a urethane moiety, a polymer elastomer including an acrylic moiety, a polymer elastomer including an olefin moiety, or any combination thereof, but is not limited thereto. The inorganic elastomer-like material may include, but is not limited to, elastic ceramics, solid metals, liquid metals, or any combination thereof.

The lower substrate 110 and the upper substrate 120 may each have one layer or two or more layers including different materials from each other. Either the lower substrate 110 or the upper substrate 120 may be omitted.

The first electrode 310 and the second electrode 320 may face each other, and one of the first electrode 310 or the second electrode 320 may be an anode and the other may be a cathode. For example, the first electrode 310 may be a cathode and the second electrode 320 may be an anode. For example, the first electrode 310 may be an anode and the second electrode 320 may be a cathode. For example, the first electrode 310 and the second electrode 320 may have different work functions from each other. For example, the work function of the first electrode 310 may be shallower than the work function of the second electrode 320.

At least one of the first electrode 310 or the second electrode 320 may be a light transmitting electrode configured to transmit light. The light transmitting electrode may be a transparent electrode or a semi-transmissive electrode. The transparent electrode may have a light transmittance of about 80% to about 100%, about 85% to about 100%, about 90% to about 100% or about 95% to about 100% for light in a visible light wavelength region, and the semi-transmissive electrode may have a light transmittance of greater than or equal to about 30% and less than about 80%, about 35% to about 75%, or about 40% to about 70% for light in a visible light wavelength region. The light transmitting electrode may be an incident electrode or a light receiving electrode.

One of the first electrode 310 and the second electrode 320 may be a reflective electrode. The reflective electrode may have, for example, a low light transmittance of less than about 10% (e.g., 0% to about 10%, about 0.1% to about 10%, about 1% to about 10%, etc.) and/or a high reflectance of greater than or equal to about 50% (e.g., about 50% to about 100%, about 50% to about 90%, about 50% to about 80%, etc.) for light in a visible light wavelength region.

The first electrode 310 and the second electrode 320 may include separate, respective conductive polymers. The separate, respective conductive polymers may include a same conductive polymer or different conductive polymers. The first electrode 310 and the second electrode 320 may include the same or different conductive polymers. For example, the first electrode 310 and the second electrode 320 may include the same conductive polymer. The conductive polymer included in the first electrode 310 and the second electrode 320 (e.g., each of the separate, respective conductive polymers included in the first electrode 310 and the second electrode 320) may be selected (e.g., may be independently selected) from a polymer that has high conductivity and is basically stretchable, for example, poly (3,4-ethylenedioxythiophene): poly (styrenesulfonate) (PEDOT: PSS) or a derivative thereof, but is not limited thereto.

As used herein, "PEDOT: PSS or a derivative thereof" refers to poly (3,4-ethylenedioxythiophene) polystyrenesulfonate as well as a structural or a chemical group modification of the polymer poly (3,4-ethylenedioxythiophene)-polystyrenesulfonate, for example, including one or more group substituents (as defined herein) on the ethylene, thiophene, or styrene moieties of the polymer, a doping of the poly (3,4-ethylenedioxythiophene) polystyrenesulfonate with another material element, compound, material, or polymer, or a grafting of a second polymer to the poly (3,4-ethylenedioxythiophene) polystyrenesulfonate.

Meanwhile, the first electrode 310 and the second electrode 320 may have different electrical properties and elongation rates from the conductive polymer included in the first electrode 310 and/or the second electrode 320. Each of the electrical resistance change rate of the first electrode and the electrical resistance change rate of the second electrode may independently be less than about 5% (e.g., 0% to about 5%, about 0.01% to about 5%, about 0.1% to about 5%, etc.) when stretched 100 times at 50% strain.

As an example, at least one of the first electrode 310 or the second electrode 320 may have a modified work function different from the work function of the conductive polymer in the first electrode 310 or the second electrode 320. For example, the work function of either the first electrode 310 or the second electrode 320 may be shallower than the work function of the conductive polymer in the first electrode 310 or the second electrode 320, or the work function of the other of the first electrode 310 and the second electrode 320 may be deeper than the work function of the conductive polymer in the first electrode 310 or the second electrode 320. For example, the work function of the first electrode 310 may be shallower than the work function of the conductive polymer in the first electrode 310, and the work function of the second electrode 320 may be deeper than the work function of the conductive polymer in the second electrode 320. For example, when the first electrode 310 and the second electrode 320 each include PEDOT: PSS or a derivative thereof, the work function of the first electrode 310 may be shallower than that of PEDOT: PSS or the derivative thereof (e.g., about 4.8 eV to about 5.1 eV) and the work function of the second electrode 320 may be deeper than that of PEDOT: PSS or the derivative thereof.

At least one of the first electrode 310 or the second electrode 320 may include a polymer additive. The polymer additive may be a semiconducting polymer or a conductive polymer other than (e.g., different from) the aforementioned conductive polymer. The polymer additive may increase stretchability of the first electrode 310 and/or the second electrode 320 and modify the work functions of the first electrode 310 and/or the second electrode 320, and may be selected from polymers that may improve bonding properties to adjacent layers. For example, for stretchability, the polymer additive may itself be a stretchable material. For example, in order to modify the work function, the polymer additive may be a material with a work function that is shallower or deeper than the work function of the conductive polymer. For example, for bonding properties to adjacent layers, the polymer additive may be selected from materials having a surface tension in a range similar to the surface tension of the material included in the photoactive layer 330, which will be described later. For example, the surface tension of the polymer additive may be about 0.5 times to less than about 2 times, about 0.6 times to about 1.8 times, about 0.7 times to about 1.6 times, or about 0.8 to about 1.5 times compared to the surface tension of the first semiconductor, second semiconductor, and/or elastomer included in the photoactive layer 330, but is not limited thereto. Accordingly, the first electrode 310 and/or the second electrode 320 may form a stable interface with the adjacent photoactive layer 330.

For example, the first electrode 310 may include the aforementioned conductive polymer and a first polymer additive. The work function (or LUMO energy level) of the first polymer additive may be shallower than the work function of the conductive polymer included in the first electrode 310, and accordingly, the first electrode 310 may have a modified work function that is shallower than that of the conductive polymer. The work function of the first electrode 310 including the conductive polymer and the first polymer additive may be shallower than the work function of the conductive polymer by greater than or equal to about 0.02 eV, and within the above range, about 0.02 eV to about 1.0 eV, about 0.02 eV to about 0.8 eV, or about 0.02 eV to about 0.6 eV. For example, the first electrode 310 may include PEDOT: PSS or a derivative thereof as the conductive polymer and a polymer including a substituted or unsubstituted ethyleneimine moiety, a polymer including a substituted or unsubstituted fluorene moiety, a polymer including a substituted or unsubstituted naphthaleneimide moiety, a copolymer thereof or any combination thereof, for example polyethyleneimine ethoxylated (PEIE), PFN-2TNDI (an amino-functionalized copolymer with a conjugated backbone composed of fluorene, naphthalene diimide, and thiophene spacers) or a derivative thereof as the first polymer additive, but is not limited thereto. For example, the first polymer additive may include a polymer including a substituted or unsubstituted ethyleneimine moiety, a polymer including a substituted or unsubstituted fluorene moiety, a polymer including a substituted or unsubstituted naphthalene diimide moiety, a copolymer thereof or any combination thereof, for example polyethyleneimine ethoxylated (PEIE), PFN-2TNDI (an amino-functionalized copolymer with a conjugated backbone composed of fluorene, naphthalene diimide, and thiophene spacers) or a derivative thereof, but is not limited thereto.

For example, the second electrode 320 may include the aforementioned conductive polymer and a second polymer additive. The work function (or HOMO energy level) of the second polymer additive may be deeper than the work function of the conductive polymer included in the second electrode 320, and accordingly, the second electrode 320 may have a modified work function that is deeper than that of the conductive polymer. The work function of the second electrode 320 including the conductive polymer and the second polymer additive may be deeper than the work function of the conductive polymer by greater than or equal to about 0.02 eV, and within the above range, about 0.02 eV to about 1.0 eV, about 0.02 eV to about 0.8 eV, or about 0.02 eV to about 0.6 eV. For example, the second electrode 320 may include PEDOT: PSS or a derivative thereof as a conductive polymer and a fluorine-containing ionomer (fluorinated ionomer) as a second polymer additive. For example, the second polymer additive may include a fluorine-containing ionomer (fluorinated ionomer). The fluorine-containing ionomer may be, for example, a polymer or copolymer including an ionizable functional group such as sulfonic acid or imide acid in a main chain having a fluoroethylene repeating unit, but is not limited thereto. In some example embodiments, the first and second electrodes 310 and 320 may include separate, respective conductive polymers, where a conductive polymer included in the first electrode 310 may be the same or different from a conductive polymer included in the second electrode 320.

The first electrode 310 and the second electrode 320 may each further include a surfactant. The surfactant may increase solubility or dispersibility of the conductive polymer in the solvent and at the same time increase miscibility of the conductive polymer with the first polymer additive or the second polymer additive. Accordingly, stretchability and electrical properties of the first electrode 310 and the second electrode 320 may be further improved. The surfactant may be, for example, a polymer having a hydrophilic repeating unit and a hydrophobic moiety, for example, a polymer having a polyethylene oxide repeating unit and an aromatic and/or aliphatic hydrocarbon group, but is not limited thereto.

The first electrode 310 and the second electrode 320 may each independently be a single layer or a multilayer. The single layer may include a mixture of conductive polymer, polymer additive, and surfactant. The multilayer may include a first layer including a conductive polymer and a second layer including a polymer additive, and the first layer and/or the second layer may further include a surfactant.

As an example, the first electrode 310 may include a first layer **310*a* including a conductive polymer and a second layer 310*b* including a first polymer additive. The surfactant may be included in the first layer 310*a* and/or the second layer 310*b*. One surface of the second layer 310*b* may be in contact with the first layer 310*a*, and the other (e.g., opposite) surface of the second layer 310*b* may be in contact with the photoactive layer 330, which will be described later. For example, an interface between the first layer 310*a* and the second layer 310*b* and/or an interface between the second layer 310*b* and the photoactive layer 330 may include crosslinked products of polymers formed by annealing, etc. Accordingly, a closer and more stable interface may be formed between the first layer 310*a*, the second layer 310*b*, and the photoactive layer 330. A thickness of the first layer 310*a* may be equal to or thicker than a thickness of the second layer 310*b*, and for example, a thickness ratio of the first layer 310*a* and the second layer 310*b*** may be about 5:5 to about 9:1, about 6:4 to about 9:1, or about 7:3 to about 9:1 within the above range, but is not limited thereto.

As an example, the second electrode 320 may include a mixture of a conductive polymer, a second polymer additive, and a surfactant. The miscibility of the conductive polymer and the second polymer additive may be high due to the surfactant, and thus the uniformity of the conductive polymer and the second polymer additive in the second electrode 320 may be increased, resulting in improved stretchability and electrical properties. A content of the conductive polymer in the second electrode 320 may be equal to or greater than a content of the second polymer additive. For example, a content ratio (weight ratio or volume ratio) of the conductive polymer and the second polymer additive in the second electrode 320 may be about 5:5 to about 9:1 and within the above range about 6:4 to about 9:1 or about 7:3 to about 9:1, but is not limited thereto.

In the above, as an example, an example in which the first electrode 310 is a multilayer and the second electrode 320 is a single layer has been described, but the present inventive concepts are not limited thereto, and the first electrode 310 and the second electrode 320 may each independently be a single layer or a multilayer.

As described above, the first electrode 310 and the second electrode 320 have a modified work function different from that of the conductive polymer, while the stretchability of the first electrode 310 and the second electrode 320 may be higher than that of a thin film made of a conductive polymer. For example, each of the elongation rate of the first electrode 310 and the elongation rate of the second electrode 320 may be higher than an elongation rate of the conductive polymer. For example, each elongation rate (e.g., elongation, indicating a length or other dimension at breaking point as a proportion of the initial length or other dimension at rest) of the first electrode 310 and the second electrode 320 may independently be about 1.1 times or more, about 1.2 times or more, about 1.3 times or more, about 1.5 times or more, about 1.1 times to about 10 times, about 1.2 times to about 10 times, about 1.3 times to about 10 times, or 1.5 times to about 10 times than the elongation rate of a thin film made of a conductive polymer (e.g., a thin film that does not include the aforementioned polymer additive). For example, each elongation rate (e.g., elongation, indicating a length or other dimension at breaking point as a proportion of the initial length or other dimension at rest) of the first electrode 310 and the second electrode 320 may independently be about 1.1 times or more, about 1.2 times or more, about 1.3 times or more, about 1.5 times or more, about 1.1 times to about 10 times, about 1.2 times to about 10 times, about 1.3 times to about 10 times, or 1.5 times to about 10 times than the elongation rate of the conductive polymer.

For example, the elongation rate of the thin film made of a conductive polymer may be less than about 50%, and each elongation rate of the first electrode 310 and the second electrode 320 (e.g., each of the elongation rate of the first electrode 310 and the elongation rate of the second electrode 320) may be more than about 50% (e.g., about 50% to about 300%). Herein, the elongation rate may be a percentage of a change in length from an initial length (e.g., a length at rest) to a breaking point. Within the above range, each elongation rate of the first electrode 310 and the second electrode 320 (e.g., each of the elongation rate of the first electrode 310 and the elongation rate of the second electrode 320) may be greater than or equal to about 60%, greater than or equal to about 70%, greater than or equal to about 80%, greater than or equal to about 85%, greater than or equal to about 90%, greater than or equal to about 95%, or greater than or equal to about 100%, and within the above range greater than about 50% and less than or equal to about 300%, about 60% to about 300%, about 70% to about 300%, about 80% to about 300%, about 85% to about 300%, about 90% to about 300%, about 95% to about 300%, or about 100% to about 300%.

As an example, each elastic modulus of the first electrode 310 and the second electrode 320 may be similar to an elastic modulus of the lower substrate 110 or the upper substrate 120 (e.g., a stretchable substrate). For example, each elastic modulus of the first electrode 310 and the second electrode 320 may be about 0.5 to about 100 times, and within the above range, about 0.5 times to about 80 times, about 0.5 times to about 60 times, about 0.5 times to about 50 times, or about 0.5 times to about 30 times the elastic modulus of the lower substrate 110 or the upper substrate 120 (e.g., stretchable substrate), but is not limited thereto.

As an example, the elastic modulus of the first electrode 310 and the second electrode 320 may each independently be, for example, about 102 Pa to about 108 Pa, about 102 Pa to about 107 Pa, or about 102 Pa to about 106 Pa, but is not limited thereto. Herein, the elastic modulus may be Young's modulus.

The photoactive layer 330 may be interposed between (e.g., directly or indirectly between) the first electrode 310 and the second electrode 320 and may be a photoelectric conversion layer configured to absorb light and convert the absorbed light into an electrical signal.

The photoactive layer 330 may be configured to absorb light in a wavelength spectrum that is at least one of, for example, a blue wavelength spectrum, a green wavelength spectrum, a red wavelength spectrum, an infrared wavelength spectrum, or an ultraviolet wavelength spectrum, and the photoactive layer 330 may be configured to convert the absorbed light into an electrical signal. Herein, the maximum absorption wavelength $\lambda_{max,A}$ of the blue wavelength spectrum, the green wavelength spectrum, the red wavelength spectrum, the infrared wavelength spectrum, and the ultraviolet wavelength spectrum may respectively belong to about 380 nm to about 500 nm, about 500 nm to about 600 nm, about 600 nm to about 750 nm, about 750 nm to about 3000 nm, and less than about 380 nm (e.g., about 10 nm to about 380 nm). For example, the photoactive layer 330 may have wavelength selectivity and may be configured to selectively absorb any one of light in the blue wavelength spectrum, light in the green wavelength spectrum, light in the red wavelength spectrum, light in the infrared wavelength spectrum, or light in the ultraviolet wavelength spectrum and convert the absorbed light into an electrical signal.

The photoactive layer 330 may include a first semiconductor, a second semiconductor, and an elastomer. The first semiconductor and the second semiconductor may have different electrical properties from each other, and these different electrical properties may cause energy transfer or charge transfer from the first semiconductor to the second semiconductor or vice versa.

The first semiconductor and the second semiconductor may independently include an organic semiconductor, an inorganic semiconductor, a two-dimensional material, or any combination thereof. The organic semiconductor may include, for example, a low molecular semiconductor, a polymer semiconductor, or any combination thereof. The inorganic semiconductor may include for example silicon, an oxide semiconductor, or any combination thereof. The two-dimensional material may include for example, metal chalcogenide including at least one of a metal element such as Mo, W, Nb, Ta, Pt, Pd, Co, Cr, Cu or Ni and at least one of a chalcogen element such as S, Se or Te. For example, the two-dimensional material may include $MoS_2$, $MoSe_2$, MoSSe, MoSTe, $Mo_{(1-x)}W_xS_2$, $Mo_{(1-x)}W_xSe_2$, $Mo_{(1-x)}W_xTe_2$, $Mo_{(1-x)}Nb_xS_2$, $Mo_{(1-x)}Nb_xSe_2$, $Mo_{(1-x)}Ta_xS_2$, $Mo_{(1-x)}Ta_xSe_2$, $Mo_{(1-x)}W_xSSe$, $MoTe_2$, $WS_2$, $Wse_2$, WSSe, $Wte_2$, WSTe, $W_{(1-x)}Nb_xS_2$, $W_{(1-x)}Nb_xSe_2$, $PtS_2$, $PtSe_2$, $PtTe_2$, $PdSe_2$, $TaS_2$, $TaSe_2$, $Ta_{(1-x)}W_xS_2$, $Ta_{(1-x)}W_xSe_2$ (herein, $0 \leq x \leq 1$), or any combination thereof.

For example, at least one of the first semiconductor or the second semiconductor may be an organic semiconductor.

For example, the first semiconductor and the second semiconductor may each be an organic semiconductor. For example, at least one of the first semiconductor or the second semiconductor may be a polymer semiconductor with a conjugated structure. For example, the first semiconductor and the second semiconductor may each be a polymer semiconductor. For example, the first semiconductor and the second semiconductor may each be a polymer semiconductor, such as polyacetylene, polythiophene, or poly (phenylene vinylene), any combination thereof, or the like.

One of the first semiconductor or the second semiconductor may be a p-type semiconductor (electron donor) and the other may be an n-type semiconductor (electron acceptor), and the first semiconductor and the second semiconductor may form a pn junction. The photoactive layer 330 may include at least one p-type semiconductor and at least one n-type semiconductor, and may receive light from the outside to generate excitons and separate the generated excitons into holes and electrons. For example, a HOMO energy level of a p-type semiconductor may be about 4.7 eV to about 5.8 eV, and within the above range, may be about 4.9 eV to about 5.6 eV or about 5.1 eV to about 5.4 eV. For example, a LUMO energy level of an n-type semiconductor may be about 3.4 eV to about 4.5 eV, and within the above range, may be about 3.6 eV to about 4.3 eV or about 3.7 eV to about 4.1 eV. A difference between the HOMO energy levels of the p-type semiconductor and the n-type semiconductor may be greater than or equal to about 0.1 eV, for example, about 0.1 eV to about 2.0 eV. A difference between the LUMO energy levels of the p-type semiconductor and the n-type semiconductor may be greater than or equal to about 0.1 eV, for example, about 0.1 eV to about 2.0 eV.

At least one of the first semiconductor or the second semiconductor included in the photoactive layer 330 may be a light absorbing material configured to absorb light. For example, at least one of the first semiconductor or the second semiconductor may be a light absorbing polymer. For example, the first semiconductor and the second semiconductor may each be a light absorbing polymer. For example, at least one of the first semiconductor or the second semiconductor may be a wavelength-selective light absorbing material configured to selectively absorb light of a particular (or, alternatively, predetermined) wavelength spectrum. For example, at least one of the first semiconductor or the second semiconductor may be a wavelength-selective light absorbing polymer. The first semiconductor and the second semiconductor may have a maximum absorption wavelength ($\lambda_{max,A}$) in the same or different wavelength region.

For example, the first semiconductor may be a p-type semiconductor, for example, a p-type polymer semiconductor including a structural unit represented by Chemical Formula 1, but is not limited thereto.

[Chemical Formula 1]

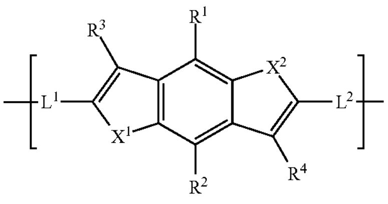

In Chemical Formula 1, $X^1$ and $X^2$ may each independently be O, S, Se, or Te, $L^1$ and $L^2$ may each independently be a single bond, a substituted or unsubstituted C1 to C30 alkylene group, a substituted or unsubstituted C3 to C30 cycloalkylene group, a substituted or unsubstituted C6 to C30 arylene group, a substituted or unsubstituted C3 to C30 heteroarylene group, or any combination thereof, and $R^1$ to $R^4$ may each independently be hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C3 to C30 heteroaryl group, a halogen, a cyano group, or any combination thereof.

For example, in Chemical Formula 1, $R^1$ and $R^2$ may each independently include a substituted or unsubstituted C3 to C30 heteroaryl group, for example, a substituted or unsubstituted C3 to C30 heteroaryl group including O, S, Se or Te.

For example, in Chemical Formula 1, $R^1$ and $R^2$ may each independently include a C3 to C30 heteroaryl group substituted with a C1 to C30 alkyl group, for example, a C3 to C30 heteroaryl group including O, S, Se, or Te and substituted with a C1 to C30 alkyl group.

For example, in Chemical Formula 1, $L^1$ and $L^2$ may each independently include a single bond or a substituted or unsubstituted C3 to C30 heteroarylene group, for example a single bond or a substituted or unsubstituted C3 to C30 heteroarylene group including O, S, Se, or Te.

For example, the second semiconductor may be an n-type semiconductor, for example, an n-type polymer semiconductor including a structural unit represented by Chemical Formula 2, but is not limited thereto.

[Chemical Formula 2]

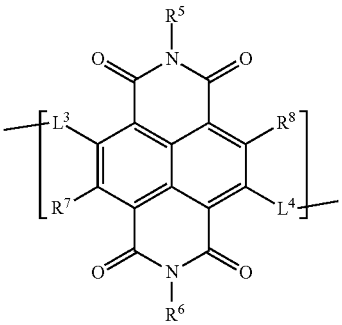

In Chemical Formula 2, $L^3$ and $L^4$ may each independently be a single bond, a substituted or unsubstituted C1 to C30 alkylene group, a substituted or unsubstituted C3 to C30 cycloalkylene group, a substituted or unsubstituted C6 to C30 arylene group, a substituted or unsubstituted C3 to C30 heteroarylene group, or any combination thereof, and $R^5$ to $R^8$ may each independently be hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C3 to C30 heteroaryl group, a halogen, a cyano group, or any combination thereof.

For example, in Chemical Formula 2, $R^5$ and $R^6$ may each independently include a substituted or unsubstituted C1 to C30 alkyl group, and for example, $R^5$ and $R^6$ may each independently include a substituted or unsubstituted C3 to C30 branched alkyl group.

For example, in Chemical Formula 2, $L^3$ and $L^4$ may each independently include a single bond or a substituted or unsubstituted C3 to C30 heteroarylene group, for example a single bond or a substituted or unsubstituted C3 to C30 heteroarylene group including O, S, Se, or Te.

For example, the second semiconductor may be an n-type semiconductor, for example, an n-type low molecule semiconductor. The n-type low molecule semiconductor may be fullerene, a fullerene derivative, or a non-fullerene compound. As described herein, examples of the fullerene may include C60, C70, C76, C78, C80, C82, C84, C90, C96, C240, C540, a mixture thereof, a fullerene nanotube, and the like. The fullerene derivative may be, for example, phenyl-C61-butyric acid methyl ester (PCBM), but is not limited thereto. The fullerene derivative may refer to compounds of these fullerenes having a substituent thereof. The fullerene derivative may include a substituent such as an alkyl group (e.g., C1 to C30 alkyl group), an aryl group (e.g., C6 to C30 aryl group), a heterocyclic group (e.g., C3 to C30 heterocycloalkyl group), and the like. Examples of the aryl groups and heterocyclic groups may be a benzene ring, a naphthalene ring, an anthracene ring, a phenanthrene ring, a fluorene ring, a triphenylene ring, a naphthacene ring, a biphenyl ring, a pyrrole ring, a furan ring, a thiophene ring, an imidazole ring, an oxazole ring, a thiazole ring, a pyridine ring, a pyrazine ring, a pyrimidine ring, a pyridazine ring, an indolizine ring, an indole ring, a benzofuran ring, a benzothiophene ring, a isobenzofuran ring, a benzimidazole ring, a imidazopyridine ring, a quinolizidine ring, a quinoline ring, a phthalazine ring, a naphthyridine ring, a quinoxaline ring, an isoquinoline ring, a carbazole ring, a phenanthridine ring, an acridine ring, a phenanthroline ring, a thianthrene ring, a chromene ring, an xanthene ring, a phenoxazine ring, a phenoxathiin ring, a phenothiazine ring, or a phenazine ring.

The first semiconductor and the second semiconductor may be included in the photoactive layer 330 in a weight ratio of about 1:9 to about 9:1, and within the above range, about 2:8 to about 8:2, about 3:7 to about 7:3, about 4:6 to about 6:4, or about 5:5.

The elastomer included in the photoactive layer 330 may be an insulating elastomer, and may be blended with the first semiconductor and the second semiconductor within the photoactive layer 330. The elastomer may be blended with the aforementioned first semiconductor and second semiconductor to provide stretchability to the photoactive layer 330, and may be distributed over the whole surface of the photoactive layer 330. For example, the elastomer may surround the first semiconductor and the second semiconductor, thereby preventing damage and/or breakage of the first semiconductor and the second semiconductor during stretching, or reducing or minimizing the likelihood of such damage and/or breakage.

The elastomer may be an insulating elastic polymer, and thus may not have an electrical influence at the interface between the first semiconductor and the second semiconductor. In addition, the elastomer may have a surface tension in a range similar to the surface tension of the first semiconductor and the second semiconductor. For example, the surface tension of the elastomer may be about 0.5 times to about 2 times, about 0.6 times to about 1.8 times, about 0.7 times to about 1.6 times, or about 0.8 times to about 1.5 times relative to the surface tension of the first semiconductor and the second semiconductor, but is not limited thereto. Accordingly, the elastomer may reduce heterogeneity with the first semiconductor and the second semiconductor in the photoactive layer 330 and increase miscibility.

For example, the elastomer may be a thermoplastic elastomer. The elastomer may be a polymer including a plurality of structural units that are the same or different from each other, and may be, for example, a copolymer including two or more different structural units. As an example, the elastomer may be a copolymer including at least one hard structural unit providing relatively hard physical properties and at least one soft structural unit providing relatively soft physical properties.

The hard structural unit may provide plastic properties such as, for example, high-temperature performance, thermoplastic processability, tensile strength and tear strength and the soft structural unit may provide low-temperature performance, hardness, flexibility, and elastomeric properties such as tension/compression. The elastomer may exhibit desired elastic properties by properly disposing the hard structural unit and the soft structural unit. The hard structural units and the soft structural units may be respectively alternately arranged or arranged in clusters or blocks in the elastomer.

The hard structural unit may include, for example, a styrene-containing structural unit, an olefin-containing structural unit, a urethane-containing structural unit, an ether-containing structural unit, or any combination thereof, but is not limited thereto. The soft structural unit may include, for example, an ethylene structural unit, a propylene structural unit, a butylene structural unit, an isobutylene structural unit, a butadiene structural unit, an isoprene structural unit, or any combination thereof, but is not limited thereto.

For example, the elastomer may be a styrene-containing polymer including a styrene structural unit as a hard structural unit and an ethylene structural unit, a propylene structural unit, a butylene structural unit, an isobutylene structural unit, a butadiene structural unit, an isoprene structural unit, or any combination thereof as a soft structural unit.

For example, the elastomer may include at least one of styrene-ethylene-butylene-styrene (SEBS), styrene-ethylene-propylene-styrene (SEPS), styrene-butadiene-styrene (SBS), styrene-isobutylene-styrene (SIBS), or a combination thereof, but is not limited thereto.

As described above, the elastomer may adjust an elastic modulus by properly disposing the hard structural unit and the soft structural unit. For example, as a weight ratio of the hard structural unit to the soft structural unit is higher, the photoactive layer 330 may have a relatively higher elastic modulus, and likewise, as the weight ratio of the hard structural unit to the soft structural unit is lower, the photoactive layer 330 may have a relatively lower elastic modulus.

For example, a weight ratio of the hard structural unit to the soft structural unit of the elastomer may be less than about 1, within the above range, less than or equal to about 0.9, less than or equal to about 0.8, less than or equal to about 0.7, less than or equal to about 0.6, less than or equal to about 0.5, less than or equal to about 0.4, or less than or equal to about 0.3, about 0.01 to about 0.9, about 0.01 to about 0.8, about 0.01 to about 0.7, about 0.01 to about 0.6, about 0.01 to about 0.5, about 0.01 to about 0.4, or about 0.01 to about 0.3. Such an elastomer may have a relatively low elastic modulus, and thus the photoactive layer 330 having a relatively high elongation rate may be implemented.

For example, the weight ratio of the hard structural unit to the soft structural unit of the elastomer may be greater than about 1, within the above range, greater than or equal to about 1.1, greater than or equal to about 1.2, greater than or equal to about 1.3, greater than or equal to about 1.4, greater than or equal to about 1.5, greater than or equal to about 1.7, greater than or equal to about 1.9, or greater than or equal to about 2.0, greater than about 1.0 and less than or equal to about 9.9, about 1.1 to about 9.9, about 1.2 to about 9.9, about 1.3 to about 9.9, about 1.4 to about 9.9, about 1.5 to about 9.9, about 1.7 to about 9.9, about 1.9 to about 9.9, or about 2.0 to about 9.9. Such an elastomer may have a relatively high elastic modulus, and thus the photoactive layer 330 having a relatively low elongation rate may be implemented.

The elastomer may be included, in the photoactive layer 330, in an amount of greater than or equal to about 20 wt % in the photoactive layer 330, for example, within the above range, greater than or equal to about 25 wt %, greater than or equal to about 30 wt %, greater than or equal to about 33 wt %, greater than or equal to about 35 wt %, greater than or equal to about 40 wt %, or greater than or equal to about 45 wt %, within the above range, about 20 wt % to about 80 wt %, about 20 wt % to about 75 wt %, about 20 wt % to about 70 wt %, about 20 wt % to about 65 wt %, about 20 wt % to about 60 wt %, about 20 wt % to about 55 wt %, about 20 wt % to about 50 wt %, about 25 wt % to about 80 wt %, about 25 wt % to about 75 wt %, about 25 wt % to about 70 wt %, about 25 wt % to about 65 wt %, about 25 wt % to about 60 wt %, about 25 wt % to about 55 wt %, about 25 wt % to about 50 wt %, about 30 wt % to about 80 wt %, about 30 wt % to about 75 wt %, about 30 wt % to about 70 wt %, about 30 wt % to about 65 wt %, about 30 wt % to about 60 wt %, about 30 wt % to about 55 wt %, about 30 wt % to about 50 wt %, about 33 wt % to about 80 wt %, about 33 wt % to about 75 wt %, about 33 wt % to about 70 wt %, about 33 wt % to about 65 wt %, about 33 wt % to about 60 wt %, about 33 wt % to about 55 wt %, about 33 wt % to about 50 wt %, about 35 wt % to about 80 wt %, about 35 wt % to about 75 wt %, about 35 wt % to about 70 wt %, about 35 wt % to about 65 wt %, about 35 wt % to about 60 wt %, about 35 wt % to about 55 wt %, about 35 wt % to about 50 wt %, about 40 wt % to about 80 wt %, about 40 wt % to about 75 wt %, about 40 wt % to about 70 wt %, about 40 wt % to about 65 wt %, about 40 wt % to about 60 wt %, about 40 wt % to about 55 wt %, about 40 wt % to about 50 wt %, about 45 wt % to about 80 wt %, about 45 wt % to about 75 wt %, about 45 wt % to about 70 wt %, about 45 wt % to about 65 wt %, about 45 wt % to about 60 wt %, about 45 wt % to about 55 wt % or about 45 wt % to about 50 wt % based on a total content of the first semiconductor, the second semiconductor, and the elastomer. Since the elastomer is included in the above ranges, stretchability may be secured without greatly degrading the electrical properties of the photoactive layer 330.

As an example, the elastomer may be included, in the photoactive layer 330, in an amount of greater than or equal to the amount of the first semiconductor in the photoactive layer 330 or the amount of the second semiconductor in the photoactive layer 330. For example, the elastomer may be included in the photoactive layer 330 in an amount of about 100 parts by weight to about 300 parts by weight, within the above range, about 100 parts by weight to about 250 parts by weight, or about 100 parts by weight to about 200 parts by weight, based on 100 parts by weight of the first semiconductor or the second semiconductor in the photoactive layer 330.

As an example, the elastic modulus of the photoactive layer 330 may be similar to that of the lower substrate 110 or the upper substrate 120 (e.g., a stretchable substrate). For example, the elastic modulus of the photoactive layer 330 may be about 0.5 times to about 100 times, and within the above range, about 0.5 times to about 80 times, about 0.5 times to about 60 times, about 0.5 times to about 50 times, or about 0.5 times to about 30 times the elastic modulus of the lower substrate 110 or the upper substrate 120 (e.g., a stretchable substrate), but is not limited thereto.

As an example, the elastic modulus of the photoactive layer 330 may be, for example, about 102 Pa to about 109 Pa, within the above range, about 102 Pa to about 108 Pa, about 102 Pa to about 107 Pa, or about 102 Pa to about 106 Pa, but is not limited to thereto. Herein, the elastic modulus may be Young's modulus.

The photoactive layer 330 may include the aforementioned elastic material and may have a relatively low elastic modulus as described above, so that it may have a relatively high elongation rate. The elongation rate of the photoactive layer 330 may be greater than about 50%, and within the above range, greater than or equal to about 60%, greater than or equal to about 70%, greater than or equal to about 80%, greater than or equal to about 85%, greater than or equal to about 90%, greater than or equal to about 95%, or greater than or equal to about 100%, within the above range, about 50% to about 500%, about 60% to about 500%, about 70% to about 500%, about 80% to about 500%, about 85% to about 500%, about 90% to about 500%, about 95% to about 500%, or about 100% to about 500%. In some example embodiments, each of the elongation rate of the first electrode 310, the elongation rate of the second electrode 320, and the elongation rate of the photoactive layer 330 may be independently greater than about 50%. In some example embodiments, a given elongation rate of a given structure, of the first electrode 310, the second electrode 320, and the photoactive layer 330, may be is a percentage of a change in length of the given structure from an initial length (e.g., a length of the given structure at rest) to a breaking point (e.g., a length of the given structure at the point at which breakage of the given structure occurs due to stretching).

The sensor 300 may further include an auxiliary layer (not shown) between (e.g., directly or indirectly between) the first electrode 310 and the photoactive layer 330 and/or between (e.g., directly or indirectly between) the second electrode 320 and the photoactive layer 330. The auxiliary layer may be a charge auxiliary layer, an optical auxiliary layer, or any combination thereof, but is not limited thereto.

The aforementioned first electrode 310, second electrode 320, and photoactive layer 330 may all be formed by a solution process, for example spin coating, slit coating, inkjet coating, dip coating, or any combination thereof, but the present inventive concepts are not limited thereto.

As described above, the sensor 300 includes the stretchable first electrode 310, the stretchable photoactive layer 330, and the stretchable second electrode 320, thereby making it possible to implement a sensor 300 in which all layers are stretchable. Therefore, unlike stretchable devices that depend only on the stretchability of the substrate such as the lower substrate 110 or the upper substrate 120, by imparting stretchability to all layers that make up (e.g., comprise) the sensor 300, a stretch limit of the sensor 300 may be overcome and at the same time, the sensor 300 may respond flexibly to external forces or external movements such as twisting, pressing, and pulling without breaking and/or damaging the sensor 300 and thus deterioration of electrical properties due to stretching may be effectively reduced, minimized, or prevented. As a result, the reliability and/or durability of the sensor 300 may be improved, and therefore the functionality of the sensor 300 may be improved, based on the sensor 300 including the first electrode 310, the photoactive layer 330, and the second electrode 320 wherein each of an elongation rate of the first electrode 310, an elongation rate of the second electrode 320, and an elongation rate of the photoactive layer 330 is independently greater than about 50%.

As described above, the elongation rate of each of the first electrode 310, the second electrode 320, and the photoactive layer 330 interposed between the lower substrate 110 and the upper substrate 120, which are stretchable substrates, may independently be greater than about 50%, and accordingly, the elongation rate of the sensor 300 may also be greater than about 50%. Within the above range, the elongation rate of the sensor 300 may be greater than or equal to about 60%, greater than or equal to about 70%, greater than or equal to about 80%, greater than or equal to about 85%, greater than or equal to about 90%, greater than or equal to about 95%, or greater than or equal to about 100%, and within the above range, about 50% to about 500%, about 60% to about 500%, about 70% to about 500%, about 80% to about 500%, about 85% to about 500%, about 90% to about 500%, about 95% to about 500%, or about 100% to about 500%.

In this way, the sensor 300 itself has a high elongation rate and thus may be directly on a stretchable substrate without providing a separate rigid region on the stretchable substrate for reducing, minimizing, or preventing breakage or damage on the device, resultantly realizing a stretchable device overcoming stretchability limitations of a conventional stretchable device provided in the rigid region but having much higher stretchability without damage on the sensor 300, such that the reliability and/or durability of the sensor 300 may be improved, and thus the functionality of the sensor 300 may be improved.

The sensor 300 may be attached to a biological surface such as skin, the inside of a living body such as an organ, or an indirect means in contact with the living body such as clothing, and thus used as a biometric sensor to detect biological signals or shapes and/or biometric information, for example, a photoplethysmography (PPG) sensor, an electroencephalogram (EEG) sensor, an electrocardiogram (ECG) sensor, a blood pressure (BP) sensor, an electromyography (EMG) sensor, a blood glucose (BG) sensor, an accelerometer, a RFID antenna, an inertial sensor, an activity sensor, a strain sensor, a motion sensor, a fingerprint sensor, or any combination thereof but is not limited thereto. For example, the sensor 300 may be attached in the form of a very thin patch or band to the living body (e.g., fingers, wrist, back of the hand, arm, chest, etc.) to monitor biometric information in real time.

For example, the sensor 300 may be the photoplethysmography (PPG) sensor, and the biometric information may include a heart rate, oxygen saturation, stress, arrhythmia, blood pressure, etc. and be obtained by analyzing a waveform of electrical signals.

Hereinafter, a sensor array including the aforementioned sensor 300 will be described.

Figure 2:
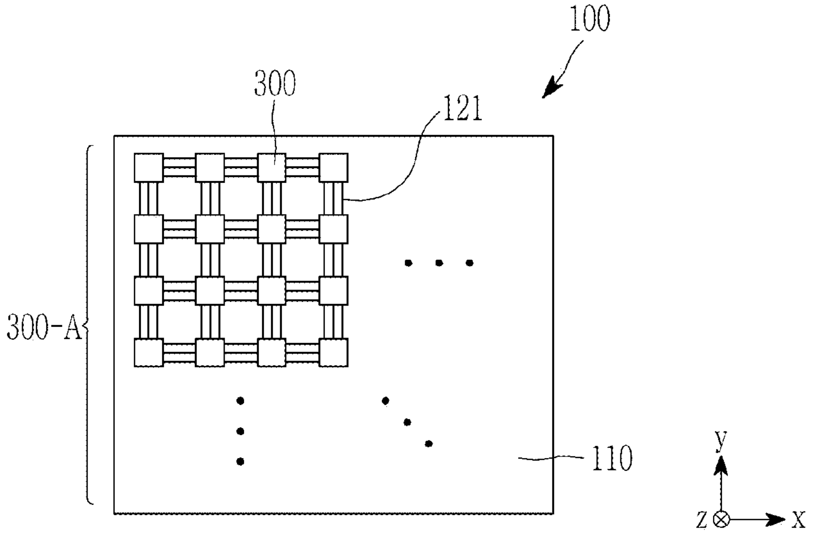
FIG. 2 is a plan view showing an example of a sensor array according to some example embodiments.

FIG. 2 is a plan view showing an example of a sensor array according to some example embodiments.

Referring to FIG. 2, the sensor array 100 according to some example embodiments includes the lower substrate 110 and a sensor array 300-A in which a plurality of sensors 300 are arranged in rows and/or columns on the lower substrate 110. In the sensor array 300-A, the plurality of sensors 300 may be arranged in, for example, a Bayer matrix, a PenTile matrix, and/or a diamond matrix, but is not limited thereto. Each of the sensors 300 is the same as described above.

In the drawing, all the sensors 300 are shown to have the same size but not limited thereto, and one or more sensors 300 may be larger or smaller than the other sensors 300. In the drawing, all the sensors 300 are shown to have the same shape but not limited thereto, and one or more sensor 300 may have a different shape from the other sensors 300.

The sensor array 100 may further include a pressure sensor (not shown).

The pressure sensor may be located between the neighboring sensors 300 or instead of some of the arranged sensors 300. The pressure sensor is a sensor configured to detect a change in pressure and may specify a location where a particular (or, alternatively, predetermined) pressure is applied in the sensor array 100 and thus exclusively operate only the sensor 300 located close to that location.

The connection wire 121 may be between the neighboring sensor 300 (e.g., between adjacent sensors 300) and may electrically connect the neighboring sensor 300 (e.g., may electrically connect the adjacent sensors 300). The connection wire 121 may be one or more than one (e.g., the sensor array 100 may include a plurality of connection wires 121) and arranged between the sensor(s) 300 arranged along a row and/or a column in a row direction (e.g., x direction) and a column direction (e.g., y direction). The connection wire 121 may be connected to a signal line (not shown), and the signal line may be, for example, a gate line transferring a gate signal (or a scan signal), a data line transferring a data signal, a driving voltage line applying a driving voltage, and/or a common voltage line applying a common voltage, but is not limited thereto. The connection wire 121 may include, for example, a low resistance conductor, for example, silver, gold, copper, aluminum, or any alloy thereof. As an example, the connection wire 121 may be a stretchable wire.

The aforementioned sensor 300 or sensor array 100 may be applied to various electronic devices requiring stretchability, for example, a bendable display panel, a foldable display panel, a rollable display panel, a skin-like display panel, a wearable device, a skin-like sensor, a large-area conformable display, smart clothing, etc., but the present inventive concepts are not limited thereto.

As an example, the aforementioned sensor 300 or sensor array 100 may be included in the display panel.

Figure 3:
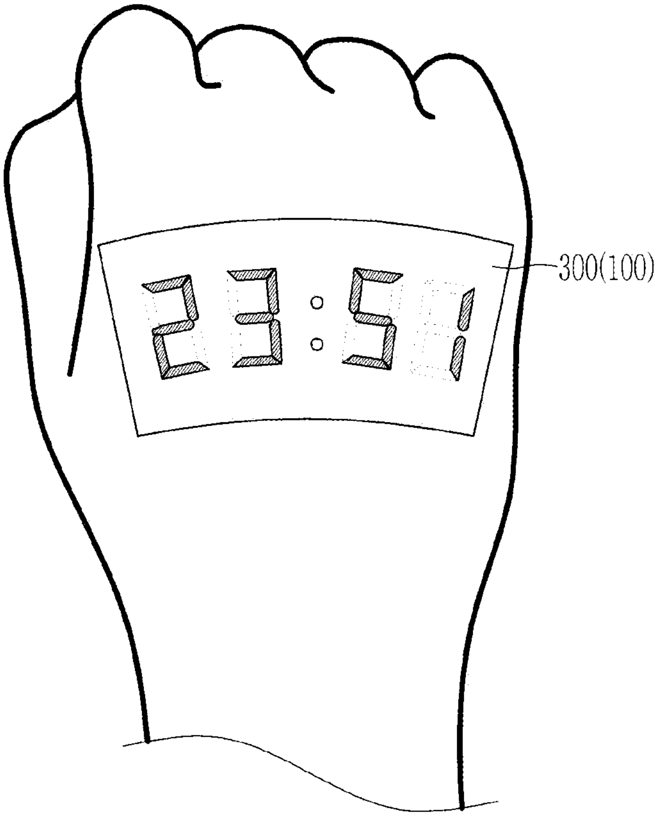
FIG. 3 is a schematic view showing an example of a skin-like display panel according to some example embodiments.

FIG. 3 is a schematic view showing an example of a skin-like display panel according to some example embodiments.

Referring to FIG. 3, the sensor 300 or sensor array 100 may be a skin-like display panel, which is an ultra-thin display panel, and may be attached to a part of a living body such as a hand. The skin-like display panel may display particular (or, alternatively, predetermined) information such as various letters and/or images. As an example, the sensor 300 or the sensor array 100 may be a biosignal sensor.

Figure 4:
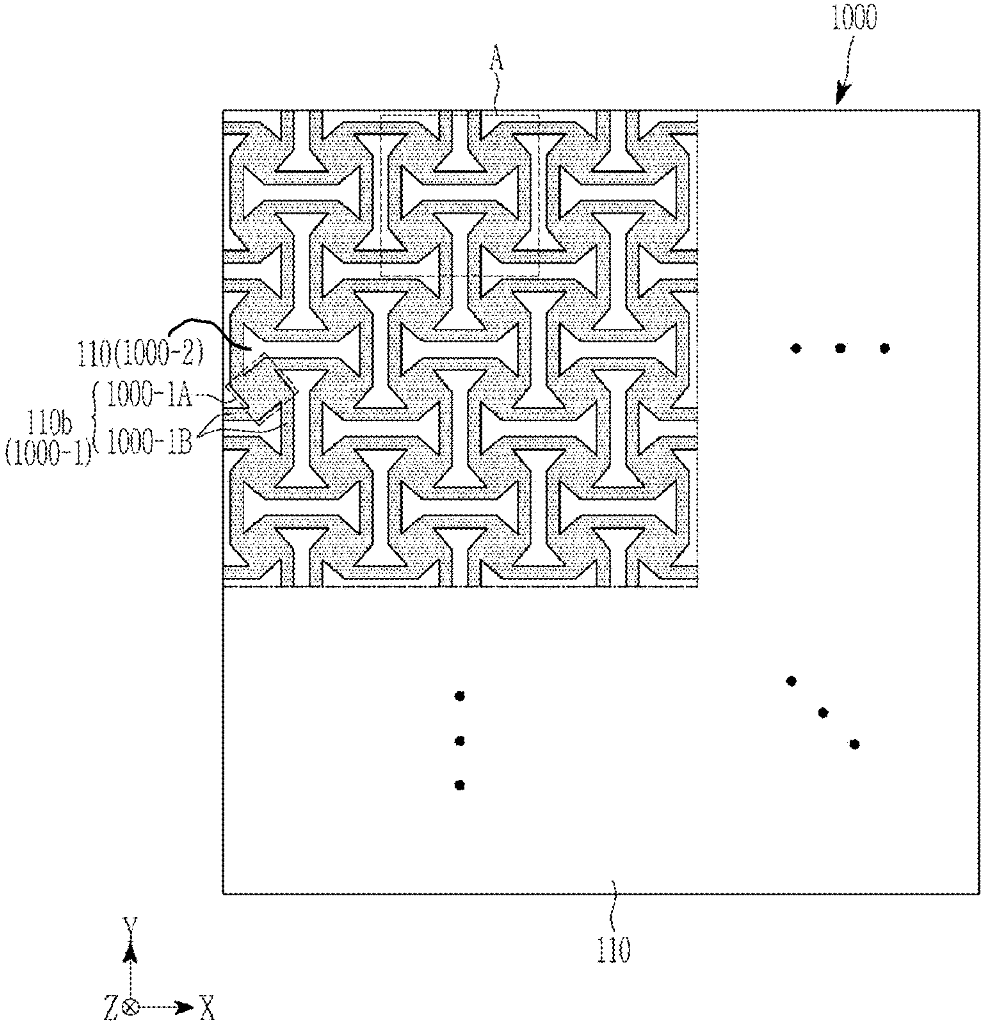
FIG. 4 is a plan view schematically showing an example of a display panel according to some example embodiments.
Figure 5:
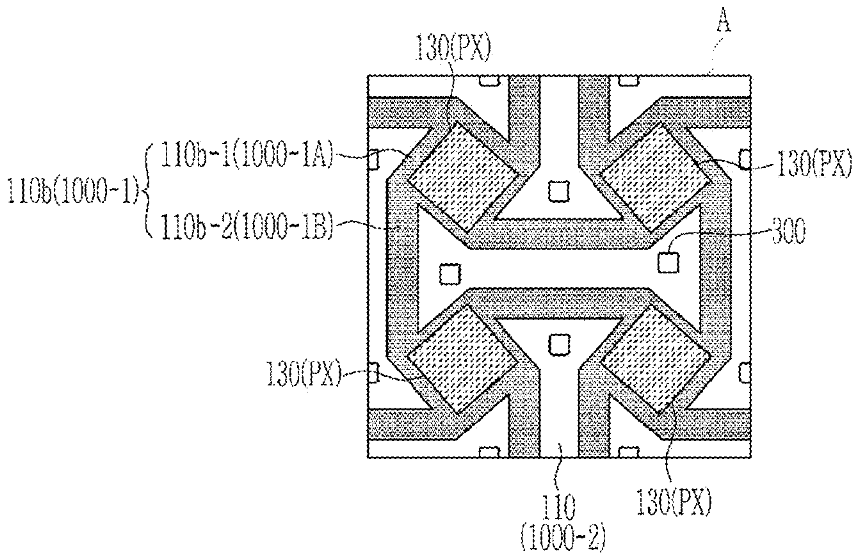
FIG. 5 is a plan view according to an example showing an enlarged view of region "A" in FIG. 4.

FIG. 4 is a plan view schematically showing an example of a display panel according to some example embodiments, and FIG. 5 is a plan view according to an example showing an enlarged view of region "A" in FIG. 4.

Referring to FIGS. 4 and 5, the display panel 1000 according to some example embodiments includes regions having a different elastic modulus along an in-plane direction (e.g., a XY direction) of the stretchable substrate 110, for example, a non-stretchable region 1000-1 with a relatively high elastic modulus and a stretchable region 1000-2 with a relatively low elastic modulus.

The non-stretchable region 1000-1 may be a region in which resistance to external force such as twisting, pressing, and pulling is relatively high, so that it is not substantially deformed by the external force or a deformation degree is very small. The non-stretchable region 1000-1 may be a region covered with the non-stretchable pattern 110*b* with a high elastic modulus on the stretchable substrate 110, as will be described later, and accordingly, have the same or substantially the same planar shape as the non-stretchable pattern 110*b*. An elastic modulus of the non-stretchable region 1000-1 may be determined by that of the non-stretchable pattern 110*b*, and even though the stretchable substrate 110 is stretched in a particular (or, alternatively, predetermined) direction, the non-stretchable region 1000-1 may not be substantially stretched or deformed by the high elastic modulus of the non-stretchable pattern 110*b*-1.

The non-stretchable region 1000-1 may include a plurality of island-shaped non-stretchable regions 1000-1A with a particular (or, alternatively, predetermined) width and linear non-stretchable regions 1000-1B connecting the neighboring island-shaped non-stretchable regions 1000-1A.

The island-shaped non-stretchable regions 1000-1A may be a region taken by a plurality of pixels PX of the display panel 1000, and in each of the island-shaped non-stretchable regions 1000-1A, the light emitting diode 130 to be described later may be disposed. The plurality of pixels PX may be repeatedly arranged in rows and/or columns, and accordingly, the plurality of island-shaped non-stretchable regions 1000-1A also may be repeatedly arranged in rows and/or columns. Each of the pixels PX may include a plurality of subpixels, and the plurality of subpixels included in each of the pixels PX may have an arrangement such as 3×1, 2×2, 3×3, or 4×4 but is not limited thereto. The plurality of pixels PX (or subpixels) may have the same arrangement as that of the light emitting diodes 130, for example, a Bayer matrix, a PenTile matrix, and/or a diamond matrix, etc. but is not limited thereto. In the following description, a pixel and a subpixel may be used interchangeably.

The non-stretchable region 1000-1B may be a region where wires of the display panel 1000 are arranged, and the wires may be, for example, gate wires, data wires, and/or driving voltage wires, but are not limited thereto.

The arrangement of the island-shaped non-stretched region 1000-1A and the linear non-stretched region 1000-1B may be modified in various ways depending on the arrangement of the plurality of pixels and the arrangement of the wiring, but when the stretchable substrate 110 is stretched, they may be arranged in a geometric pattern so that three-dimensional transformation may occur. The geometric pattern may include, for example, a kirigami pattern including cut lines, but is not limited thereto. The geometric pattern of the non-stretchable region 1000-1 is such that when an external force such as twisting, pressing, or pulling in a particular (or, alternatively, predetermined) direction is applied to the display panel 1000, even if the non-stretchable region 1000-1 is not flexibly stretched by an external force like the stretchable substrate 110, it may be enable three-dimensional deformation of the display panel 1000.

The stretchable region 1000-2 is a region capable of flexibly responding to an external force such as twisting, pressing, and pulling, and may be a region excluding the non-stretchable region 1000-1. The stretchable region 1000-2 may be a region in which the non-stretchable pattern 110*b* is not covered on the stretchable substrate 110 and may be relatively evenly disposed on the whole surface of the display panel 1000. The elastic modulus of the stretchable region 1000-2 may be the same or substantially the same as the elastic modulus of the stretchable substrate 110. The stretchable region 1000-2 may be surrounded and isolated by the non-stretchable region 1000-1, but is not limited thereto, and on the contrary, the non-stretchable region 1000-1 may be surrounded and isolated by the stretchable region 1000-2.

Referring to FIG. 5, the display panel 1000 according to some example embodiments includes the stretchable substrate 110, the non-stretchable pattern 110*b* covering a portion of the stretchable substrate 110, the light emitting diode 130, and the sensor 300.

The non-stretchable pattern 110*b* may be on the stretchable substrate 110 to cover a portion of the stretchable substrate 110. The non-stretchable pattern 110*b* may define the non-stretchable region 1000-1 of FIG. 4, wherein, for example, the stretchable substrate 110 covered with the non-stretchable pattern 110*b* may be the non-stretchable region 1000-1, while the stretchable substrate 110 not covered with the non-stretchable pattern 110*b* may be the stretchable region 1000-2.

The non-stretchable pattern 110*b* may include an organic material, an inorganic material, an organic/inorganic material, or any combination thereof, which has a high elastic modulus that exhibits relatively high resistance to an external force such as twisting, pressing, and pulling. For example, the elastic modulus of the non-stretchable pattern 110*b* may be greater than or equal to about 100 times higher than that of the stretchable substrate 110 and within the range, for example, about 100 times to about 106 times as high as that of the stretchable substrate 110. For example, the non-stretchable pattern 110*b* may include an organic material with a relatively high elastic modulus, for example, polycarbonate, polymethylmethacrylate, polyethyleneterephthalate, polyethylenenaphthalate, polyimide, polyamide, polyamideimide, polyethersulfone, or any combination thereof, but is not limited thereto. For example, the stretchable substrate 110 may include a stretchable polymer (e.g., a substituted or unsubstituted polyorganosiloxane such as polydimethylsiloxane (PDMS), a polymer elastomer including a substituted or unsubstituted butadiene moiety such as styrene-ethylene-butylene-styrene (SEBS), a polymer elastomer including a urethane moiety, a polymer elastomer including an acrylic moiety, a polymer elastomer including an olefin moiety, or any combination thereof), and the non-stretchable pattern 110*b*, which may include a non-stretchable region 1000-1, may include a non-stretchable polymer (e.g., polycarbonate, polymethylmethacrylate, polyethyleneterephthalate, polyethylenenaphthalate, polyimide, polyamide, polyamideimide, polyethersulfone, or any combination thereof) having an elastic modulus that is greater than or equal to about 100 times higher than an elastic modulus of a stretchable polymer and within the range, for example, about 100 times to about 106 times as high as the elastic modulus of the stretchable polymer.

The non-stretchable pattern 110*b* may be formed by, for example, coating or depositing a material (e.g., an organic material) with a relatively high elastic modulus on the stretchable substrate 110 and partially removing it by, for example, etching, to leave the non-stretchable pattern 110*b* only in the portion corresponding to the non-stretchable region 1000-1. However, the present inventive concepts are not limited thereto, and the non-stretchable region 1000-1 and the stretchable region 1000-2 having different elastic moduli may be implemented by forming the non-stretchable pattern 110*b* on the stretchable substrate 110 in various ways.

The non-stretchable pattern 110*b* includes a plurality of island-shaped non-stretchable patterns 110*b*-1 repeatedly disposed on the stretchable substrate 110 and a plurality of linear non-stretchable patterns 110*b*-2 connecting the neighboring non-stretchable patterns 110$b$-1. The plurality of island-shaped non-stretchable patterns 110$b$-1 may correspond to the aforementioned plurality of island-shaped non-stretchable regions 1000-1A, and the plurality of linear non-stretchable patterns 110$b$-2 may correspond to the aforementioned plurality of linear non-stretchable regions 1000-1B. As the light emitting diode 130 to be described later is disposed in each of the island-shaped non-stretchable patterns 110$b$-1, each of the island-shape non-stretchable patterns 110$b$-1 has a larger size (area) than each light emitting diode 130, and as a wire to be described later is disposed in each of the linear non-stretchable patterns 110$b$-2, each of the linear non-stretchable patterns 110$b$-2 may have a wider width than each wire.

The plurality of light emitting diodes 130 are repeatedly arranged on the stretchable substrate 110, and each of the light emitting diodes 130 may define each pixel PX (or subpixel) of the stretching display panel 1000. The plurality of light emitting diodes 130 may be, for example, arranged in rows and/or columns to form a light emitting diode array. The light emitting diode array like an array of the pixels PX may be, for example, arranged in a Bayer matrix, a Pentile matrix, and/or a diamond matrix but is not limited thereto.

For example, each of the light emitting diodes 130 may be an organic light emitting diode, an inorganic light emitting diode, a quantum dot light emitting diode, a micro light emitting diode, or a perovskite light emitting diode that independently display red, green, blue, or any combination thereof, but is not limited thereto.

Each of the light emitting diodes 130 may be electrically connected to at least one thin film transistor TFT (not shown), and at least one thin film transistor may independently control and/or drive each pixel PX. The thin film transistor in each pixel PX (or subpixel) may include at least one switching thin film transistor and at least one driving thin film transistor. Each of the thin film transistors may be on the island-shaped non-stretchable patterns 110$b$-1 or in the stretchable region 1000-2. For example, the thin film transistor on the island-shaped non-stretchable patterns 110$b$-1 may include a non-stretchable semiconductor layer, and the thin film transistor in the stretchable region 1000-2 may include a stretchable semiconductor layer. The non-stretchable semiconductor layer may include an inorganic semiconductor layer, for example, silicon, an oxide semiconductor, or any combination thereof. The stretchable semiconductor layer may include an organic semiconductor, a two-dimensional material, or any combination thereof, and may optionally further include an elastomer. The organic semiconductor may include, for example, a low molecular weight semiconductor, a polymer semiconductor, or any combination thereof. The two-dimensional material may include, for example, at least one metal element and at least one chalcogen element, and the metal element may be, for example, Mo, W, Nb, Ta, Pt, Pd, Co, Cr, Cu or Ni, and the chalcogen element may be, for example, S, Se, or Te. For example, the two-dimensional material may include $MoS_2$, $MoSe_2$, MoSSe, MoSTe, $Mo_{(1-x)}W_xS_2$, $Mo_{(1-x)}W_xSe_2$, $Mo_{(1-x)}W_xTe_2$, $Mo_{(1-x)}Nb_xS_2$, $Mo(1-x)Nb_xSe_2$, $Mo(1-x)Ta_xS_2$, $Mo_{(1-x)}Ta_xSe_2$, $Mo_{(1-x)}W_xSSe$, $MoTe_2$, $WS_2$, $WSe_2$, WSSe, $WTe_2$, WSTe, $W_{(1-x)}Nb_xS_2$, $W_{(1-x)}Nb_xSe_2$, $PtS_2$, $PtSe_2$, $PtTe_2$, $PdSe_2$, $TaS_2$, $TaSe_2$, $Ta_{(1-x)}W_xS_2$, $Ta_{(1-x)}W_xSe_2$ (herein, $0 \le x \le 1$), or any combination thereof, but are not limited thereto. The elastomer may include, for example, polydimethylsiloxane (PDMS), styrene-ethylene-butylene-styrene (SEBS), styrene-ethylene-propylene-styrene (SEPS), styrene-butadiene-styrene (SBS), styrene-isoprene-styrene (SIS), styrene-isobutylene-styrene (SIBS), or a combination thereof, but is not limited thereto. For example, at least a part of the thin film transistors may be in the stretchable region 1000-2, and the area occupied by the thin film transistor in the pixel PX may be reduced compared to the structure in which all thin film transistors are in each pixel PX, thereby overcoming the limitation of the reduction in the size of the pixel PX and effectively reducing the size of the pixel. Therefore, the high-resolution display panel 1000 may be implemented by overcoming the limitation of the spatial arrangement of the display panel 1000 and increasing the number of pixels PX per unit area on the stretchable substrate 110.

The sensor 300 is the same as described above. As described above, the sensor 300 may realize the stretchable first electrode 310, the stretchable photoactive layer 330, and the stretchable second electrode 320 to implement the sensor 300 of which all layers are stretchable. In this way, the sensor 300 itself has a high elongation rate and thus may be directly on the stretchable substrate 110, that is, in the stretchable region 1000-2 not covered with the non-stretchable pattern 110$b$. Accordingly, since the sensor 300 does not need to be disposed in the pixels PX where the non-stretchable pattern 110$b$ is formed, the sensor 300 may be without reducing a size of the region taken by the light emitting diode 130, which may lead to efficiently using space of the display panel 1000. Therefore, it is possible to implement an integrated stretchable display panel that may additionally perform a sensor function without deteriorating display quality, such that the integrated display panel may have improved reliability and/or durability and thus may have improved functionality.

Additionally, the number of pixels per unit area may be increased by efficient spatial arrangement of the display panel 1000. For example, the number of pixels per unit area in the display panel 1000 may be greater than or equal to about 150 ppi (pixel per inch), greater than or equal to about 200 ppi, greater than or equal to about 250 ppi, greater than or equal to about 300 ppi, greater than or equal to about 350 ppi, greater than or equal to about 400 ppi, greater than or equal to about 450 ppi, or greater than or equal to about 500 ppi and may be, for example, about 150 ppi to about 1000 ppi, about 200 ppi to about 1000 ppi, about 250 ppi to about 1000 ppi, about 300 ppi to about 1000 ppi, about 350 ppi to about 1000 ppi, about 400 ppi to about 1000 ppi, about 450 ppi to about 1000 ppi, or about 500 ppi to about 1000 ppi. Therefore, a high-resolution display panel may be implemented.

In FIG. 5, the sensor 300 is shown in an arbitrary shape and size for convenience of explanation, but the shape and size of the sensor 300 may vary. Also, in FIG. 5, the sensor 300 is shown at an arbitrary position within the stretchable region 1000-2 for better comprehension and ease of description, but the sensor 300 may be located anywhere within the stretchable region 1000-2.

Figure 6:
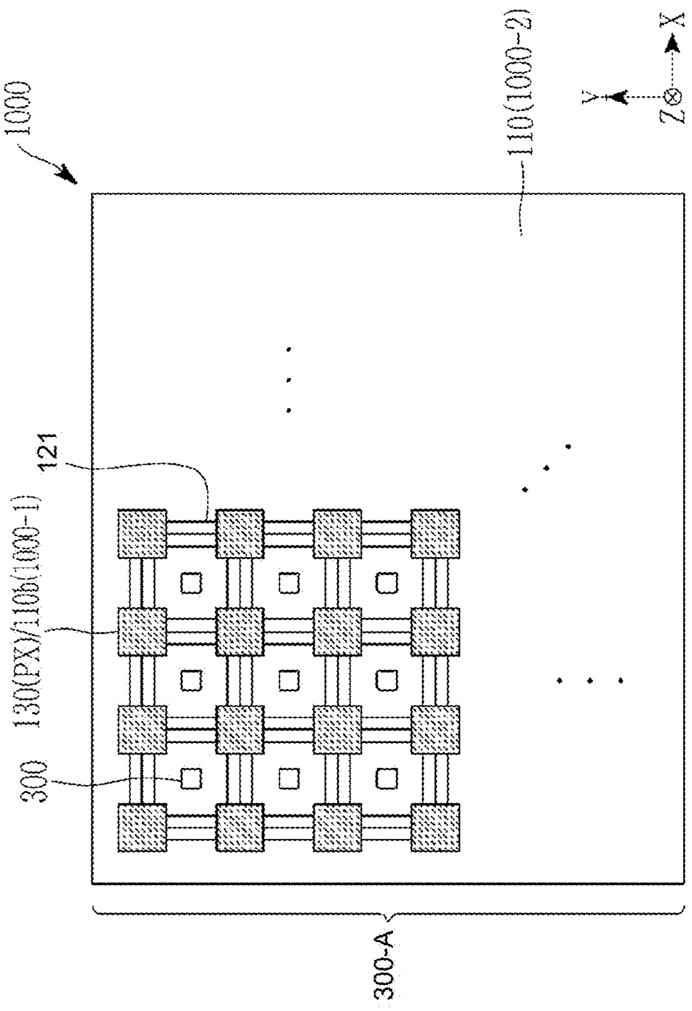
FIG. 6 is a plan view schematically showing another example of a display panel according to some example embodiments.

FIG. 6 is a plan view schematically showing another example of a display panel according to some example embodiments.

Referring to FIG. 6, the display panel 1000 according to some example embodiments, some example embodiments, including the example embodiments shown in at least FIGS. 2 and/or FIGS. 4-5, includes the stretchable region 1000-2 and the non-stretchable region 1000-1, wherein the stretchable region 1000-2 may be a region not covered with the non-stretchable pattern 110$b$ on the stretchable substrate 110, while the non-stretchable region 1000-1 may be a region covered with the non-stretchable pattern 110$b$.

However, in the display panel 1000 according to some example embodiments, unlike the display panel 1000 according to some example embodiments, including the example embodiments shown in at least FIGS. 2 and/or FIGS. 4-5, the non-stretchable patterns 110*b* are separated each other on the stretchable substrate 110, and each of the light emitting diodes 130 is disposed in each non-stretchable region 1000-1.

The sensor 300, as described above, includes the stretchable first electrode 310, the stretchable photoactive layer 330, and the stretchable second electrode 320, realizing the sensor 300 of which all layers may be stretchable. In this way, the sensor 300 itself has a high elongation rate and thus may be directly on the stretchable substrate 110, that is, in the stretchable region 1000-2 not covered with the non-stretchable pattern 110*b*. Accordingly, as the sensor 300 does not need to be disposed in the pixel PX where the non-stretchable pattern 110*b* is formed, the sensor 300 may be disposed without reducing a size of the region taken by the light emitting diode 130, which may lead to efficiently using space of the display panel 1000. Therefore, it is possible to implement an integrated stretchable display panel that may additionally perform sensor functions without deteriorating display quality, such that the functionality of a device including the display panel 1000 may be improved.

The aforementioned sensor 300, sensor array 100, and/or display panel 1000 may be applied to various electronic devices that require flexibility and/or stretchability, and may be applied to, for example, mobile phones, video phones, smart phones, smart pads, smart watches, digital cameras, tablet PCs, laptop PCs, notebook computers, computer monitors, wearable computers, televisions, digital broadcasting terminals, e-books, and personal digital assistants (PDAs), PMP (portable multimedia player), EDA (enterprise digital assistant), head mounted displays (HMD), in-vehicle navigations, Internet of Things (IoT), Internet of Everything (IoE), security devices, medical devices, but are not limited thereto.

Hereinafter, some example embodiments are illustrated in more detail with reference to examples. However, the example embodiments are not limited to these examples.

Preparation Example I: Preparation of Conductive Solution for Electrodes

Preparation Example 1

4 ml of PEDOT: PSS (Heraeus Clevios™ PH1000), 0.2 ml of t-octylphenoxypolyethoxyethanol (Triton X-100, Sigma-Aldrich) (surfactant), and 0.2 ml of dimethylsulfoxide (DMSO) are mixed and then, filtered through a PVDF filter with a pore size of 0.45 μm to prepare a conductive solution for an electrode.

Preparation Example 2

Polyethyleneimine ethoxylate (PEIE) is dissolved in 2-methoxyethanol at a concentration of 2 wt % to prepare a conductive solution for an electrode.

Preparation Example 3

4 ml of PEDOT: PSS (Heraeus Clevios™ PH1000), 2 ml of a tetrafluoroethylene-perfluoro-3,6-dioxa-4-methyl-7-octenesulfonic acid copolymer (Sigma-Aldrich Co. Ltd.), 0.2 ml of t-octylphenoxypolyethoxyethanol (Triton X-100, Sigma-Aldrich Co. Ltd.) (surfactant), and 0.2 ml of dimethylsulfoxide (DMSO) are mixed and then, filtered the mixture through a PVDF filter with a pore size of 0.45 μm to prepare a conductive solution for an electrode.

Preparation Example II: Preparation of Polymer Semiconductor Solution

Preparation Example 4

Polymer A (p-type semiconductor, Mw=40,000 to 50,000 g/mol, surface tension: 26.1 mJ/m$^2$) (One-Material Inc.), Polymer B (n-type semiconductor, Mw=60,000 to 70,000 g/mol, surface tension: 25.8 mJ/m$^2$) (eFlexPV Ltd.), and styrene-ethylene-butylene-styrene (SEBS) (elastomer, Tuftec™ H1221, Asahi Kasei Corp.) (surface tension: 28.6 mJ/m$^2$) are mixed in chloroform (25 mg/ml) in a weight ratio of 25:25:50 and then, stirred the mixture at 40° C. for 12 hours to prepare a polymer semiconductor solution for a photoactive layer.

[Polymer A]

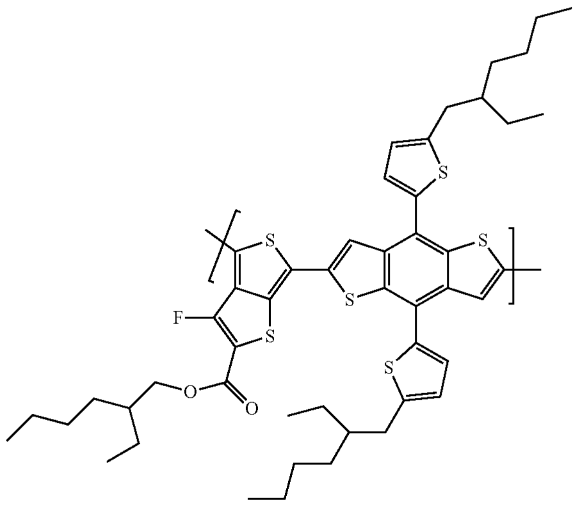

[Polymer B]

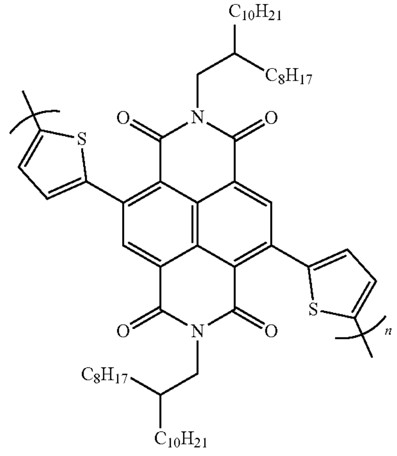

Preparation Example 5: Preparation of Polymer Semiconductor Solution

A polymer semiconductor solution for a photoactive layer is prepared in the same manner as in Preparation Example 4 except that the styrene-ethylene-butylene-styrene (SEBS) is not included.

Preparation Example III: Preparation of Stretchable Substrate

Preparation Example 6

PDMS (SYLGARD™ 184, Silicone Elastomer Kit, Dow Corning Corp.) and a hardener (SYLGARD™ 184 elastomer kit, Dow Corning Corp.) are mixed in a weight ratio of 12.5:1 to obtain a PDMS mixture. Subsequently, the PDMS mixture is spin-coated on a glass plate with a sacrificial layer (Dextran) at 600 rpm for 60 seconds and then annealed it at 90° C. for 2 hours to form a stretchable substrate.

Preparation Example IV: Preparation of Electrodes and Photoactive Lavers

Reference Preparation Example 1

The conductive solution for an electrode according to Preparation Example 1 is spin-coated on a glass plate with a sacrificial layer at 1000 rpm for 60 seconds and then, annealed at 140° C. for 10 minutes to form an electrode (surface tension: 59.67 mN/m). Subsequently, the electrode is transferred onto the stretchable substrate according to Preparation Example 6 to prepare the electrode on the stretchable substrate. Then, the sacrificial layer is removed by dissolving to separate the electrode from the glass plate.

Preparation Example 7-1

The conductive solution for an electrode according to Preparation Example 1 is spin-coated on a glass plate with a sacrificial layer at 1000 rpm for 60 seconds and then, annealed at 140° C. for 10 minutes to form a first layer, and the conductive solution for an electrode according to Preparation Example 2 is spin-coated thereon at 5000 rpm for 60 seconds and annealed at 100° C. for 10 minutes to form a second layer, forming a bi-layered electrode (surface tension: 39.19 mN/m). Subsequently, the bi-layered electrode is transferred onto the stretchable substrate according to Preparation Example 6 to prepare the electrode on the stretchable substrate. Then, the sacrificial layer is removed by dissolving to separate the electrode from the glass plate.

Preparation Example 7-2

The conductive solution for an electrode according to Preparation Example 3 is spin-coated on a glass plate with a sacrificial layer at 1000 rpm for 60 seconds to form an electrode. Subsequently, the electrode is transferred onto the stretchable substrate according to Preparation Example 6 to prepare the electrode on the stretchable substrate. Then, the sacrificial layer is removed by dissolving to separate the electrode from the glass plate.

Preparation Example 8

The polymer semiconductor solution for a photoactive layer according to Preparation Example 4 is spin-coated on a glass plate with a sacrificial layer at 1000 rpm for 90 seconds to form a photoactive layer (surface tension: 30.22 mN/m). Subsequently, the photoactive layer is transferred onto the stretchable substrate according to Preparation Example 6 to prepare the photoactive layer on the stretchable substrate. Then, the sacrificial layer is removed by dissolving to separate the photoactive layer from the glass plate.

Reference Preparation Example 2

A photoactive layer (surface tension: 30.97 mN/m) on the stretchable substrate is prepared in the same manner as in Preparation Example 2 except that the polymer semiconductor solution for a photoactive layer according to Preparation Example 5 instead of the polymer semiconductor solution for a photoactive layer according to Preparation Example 4 is used.

Preparation Example 9

The polymer semiconductor solution for a photoactive layer according to Preparation Example 4 is spin-coated on a glass plate with a sacrificial layer at 1000 rpm for 90 seconds to form a photoactive layer. Subsequently, the photoactive layer is transferred onto the electrode according to Preparation Example 7-1 to prepare the photoactive layer/electrode stack. Then, the sacrificial layer is removed by dissolving to separate the photoactive layer/electrode stack from the glass plate.

Reference Preparation Example 3-1

The polymer semiconductor solution for a photoactive layer according to Preparation Example 4 is spin-coated on a glass plate with a sacrificial layer at 1000 rpm for 90 seconds to form a photoactive layer. Subsequently, the photoactive layer is transferred onto the electrode according to Reference Preparation Example 1 to prepare the photoactive layer/electrode stack. Then, the sacrificial layer is removed by dissolving to separate the photoactive layer/electrode stack from the glass plate.

Reference Preparation Example 3-2

A photoactive layer/electrode stack is prepared in the same manner as in Reference Preparation Example 3-1 except that the polymer semiconductor solution for a photoactive layer according to Preparation Example 5 instead of the polymer semiconductor solution for a photoactive layer according to Preparation Example 4 is used.

Reference Preparation Example 3-3

The polymer semiconductor solution for a photoactive layer according to Preparation Example 5 is spin-coated on a glass plate with a sacrificial layer at 1000 rpm for 90 seconds to form a photoactive layer. Subsequently, the photoactive layer is transferred onto the electrode according to Preparation Example 1-1 to prepare the photoactive layer/electrode stack. Then, the sacrificial layer is removed by dissolving to separate the photoactive layer/electrode stack from the glass plate.

Evaluation I

The electrodes according to Preparation Examples 7-1 and 7-2 and Reference Preparation Example 1 are evaluated with respect to a work function. The work function is measured by using UV photoelectron spectroscopy (UPS).

The results are shown in Table 1.

TABLE 1

| | Work function of electrode (eV) |
|---|---|
| Reference Preparation Example 1 | 5.0 |
| Preparation Example 7-1 | 4.3 |
| Preparation Example 7-2 | 5.3 |

Referring to Table 1, it is confirmed that the electrodes according to Preparation Examples 7-1 and 7-2 and Reference Preparation Example 1 have a different work function, and specifically, the electrode according to Preparation Example 7-1 has a shallower work function than that of Reference Preparation Example 1, and the electrode according to Preparation Example 7-2 has a deeper work function than that of Reference Preparation Example 1.

Evaluation II

The electrodes according to Preparation Examples 7-1 and 7-2 and Reference Preparation Example 1, the photoactive layers according to Preparation Example 8 and Reference Preparation Example 2, and the electrode/photoactive layer stacks according to Preparation Example 9 and Reference Preparation Example 3-1 are evaluated with respect to an elongation rate.

The results are shown in Tables 2 to 4.

TABLE 2

| | Elongation rate (%) |
|---|---|
| Reference Preparation Example 1 | 40 |
| Preparation Example 7-1 | 75 |
| Preparation Example 7-2 | 80 |

TABLE 3

| | Elongation rate (%) |
|---|---|
| Reference Preparation Example 2 | 25 |
| Preparation Example 8 | 150 |

TABLE 4

| | Elongation rate (%) |
|---|---|
| Reference Preparation Example 3-1 | 50 |
| Preparation Example 9 | 120 |

Referring to Tables 2 to 4, the electrodes, the photoactive layers, and the electrode/photoactive layer stacks according to Preparation Examples exhibit a higher elongation rate than those of Reference Preparation Examples.

Evaluation III

The electrodes according to Preparation Examples 7-1 and 7-2 and Reference Preparation Example 1 are evaluated with respect to changes in electrical properties according to repeated stretching.

The changes in electrical properties according to stretching are evaluated from an electrical resistance change rate according to the number of repetitions of elongation and restoration at strain of 50%.

Figure 7:
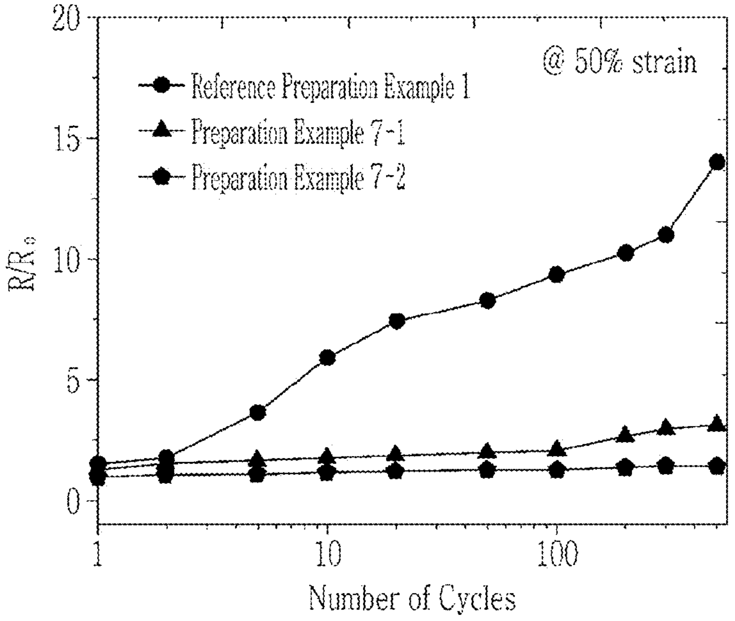
FIG. 7 is a graph showing changes in electrical properties according to repeated stretching of electrodes according to Preparation Examples 7-1 and 7-2 and Reference Preparation Example 1 according to some example embodiments.

The results are shown in FIG. 7.

FIG. 7 is a graph showing changes in electrical properties according to repeated stretching of electrodes according to Preparation Examples 7-1 and 7-2 and Reference Preparation Example 1. As shown in FIG. 7, the Y-axis shows a ratio of the electrical resistance R of the electrodes after repeated stretching of the electrodes at a strain of 50% over a quantity of stretching cycles in relation to the initial electrical resistance $R_0$ of the electrodes prior to any cycles of stretching of the electrodes, and the X-axis shows the quantity of stretching cycles at a strain of 50%.

Referring to FIG. 7, the electrodes according to Preparation Examples 7-1 and 7-2 exhibit little or substantially no change in electrical resistance even after repeated stretching over 100 times, but the electrode according to Reference Preparation Example 1 exhibits a large change in electrical resistance to repeated stretching over 100 times.

Evaluation IV

The electrode/photoactive layer stacks according to Preparation Example 9 and Reference Preparation Examples 3-1 to 3-3 are evaluated with respect to mechanical characteristics.

The mechanical characteristics are evaluated from an elongation rate (crack on set, COS) at a point that microcracks with a size of several micrometers are observed on an optical microscope image, when each of the electrode/photoactive layer stacks according to Preparation Example 9 and Reference Preparation Examples 3-1 to 3-3 is stretched in both directions (e.g., length direction).

The results are shown in Table 5.

TABLE 5

| | COS (%) |
|---|---|
| Preparation Example 9 | 120 |
| Reference Preparation Example 3-1 | 50 |
| Reference Preparation Example 3-2 | 40 |
| Reference Preparation Example 3-3 | 60 |

Referring to Table 5, the electrode/photoactive layer stack according to Preparation Example 9, compared with the electrode/photoactive layer stacked according to Reference Preparation Examples 3-1 to 3-3, exhibits improved mechanical characteristics.

Manufacturing of Sensors

Example 1

The conductive solution for an electrode according to Preparation Example 1 is spin-coated onto the stretchable substrate according to Preparation Example 6 at 1000 rpm for 60 seconds and then, annealed at 140° C. for 10 minutes to form a first layer, and the conductive solution for an electrode according to Preparation Example 2 is spin-coated thereon at 5000 rpm for 60 seconds and annealed at 100° C. for 10 minutes to form a second layer, manufacturing a bi-layered lower electrode. Subsequently, on the bi-layered lower electrode, the polymer semiconductor solution for a photoactive layer according to Preparation Example 4 is spin-coated at 1000 rpm for 90 seconds to form a photoactive layer.

Separately, the conductive solution for an electrode according to Preparation Example 3 is spin-coated onto the stretchable substrate of Preparation Example 6 at 1000 rpm for 60 seconds to form the stretchable substrate/conductive film for an upper electrode stack.

Then, after detaching the stretchable substrate/conductive film for an upper electrode stack from the glass plate, the conductive film for an upper electrode is stacked to face the photoactive layer on the lower electrode to form the lower electrode/photoactive layer/upper electrode stack on the stretchable substrate. Then, the upper electrode and the stretchable substrate are sufficiently dried under high vacuum ($10^{-6}$ Torr) for 6 hours or more, and the sacrificial layer is removed by dissolving from the glass plate to manufacture a sensor consisting of the lower electrode/photoactive layer/upper electrode stack on the stretchable substrate.

Comparative Example 1

A sensor is manufactured in the same manner as in Example 1 except that the polymer semiconductor solution for a photoactive layer according to Preparation Example 5 is used instead of the polymer semiconductor solution for a photoactive layer according to Preparation Example 4 to form the photoactive layer.

Evaluation V

The sensors according to Example 1 and Comparative Example 1 are evaluated with respect to electrical properties according to elongation.

The electrical properties according to elongation are evaluated from changes in current density and external quantum efficiency (EQE) (%) when the sensors according to Examples and Comparative Examples are stretched while changing a percentage of a stretched length to an initial length ("stretchability") from 0% to 100%.

The current density-voltage characteristics are evaluated by using a current-voltage equipment (Keithley K4200 parameter analyzer).

The external quantum efficiency (EQE) is evaluated by irradiating monochromatic light with an Xe lamp equipped with an optical filter (chopper frequency: 50 Hz) and using a spectral photon-to-electron conversion efficiency measurement system.

Figure 8:
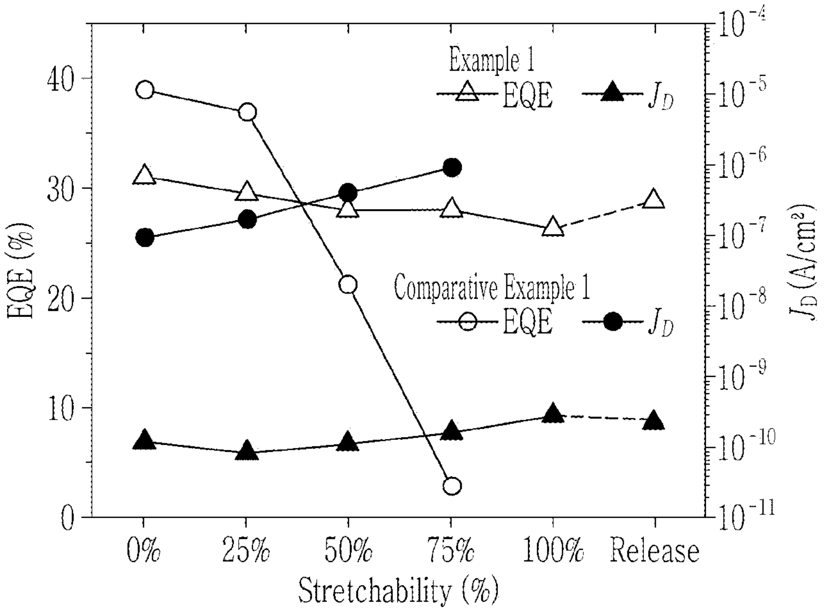
FIG. 8 is a graph showing electrical properties according to stretching of sensors according to Example 1 and Comparative Example 1 according to some example embodiments.

The results are shown in FIG. 8.

FIG. 8 is a graph showing electrical properties according to stretching of sensors according to Example 1 and Comparative Example 1.

Referring to FIG. 8, the sensor of Example 1 exhibits a smaller change in electrical properties than that of Comparative Example 1, which confirms that the sensor of Example 1 exhibits higher elongation stability than that of Comparative Example 1.

Evaluation VI

The sensor of Example 1 is evaluated with respect to biological signal detection performance according to stretching.

The biological signal detection performance according to stretching is evaluated by attaching the sensor near radial artery of the wrist or the thumb to measure biological signals (PPG) in a stationary state (0% strain) and in a stretched state with motion (33% strain).

Figure 9:
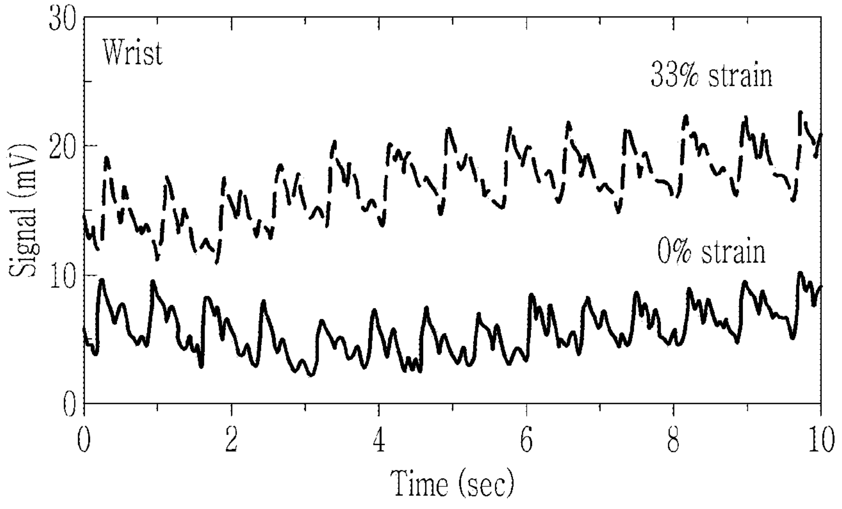
FIG. 9 is a graph showing biological signals (PPG) in a stationary state (0% strain) and biological signals (PPG) in a stretched state (33% strain) due to movement after attaching the sensor according to Example 1 near the radial artery of the wrist according to some example embodiments.
Figure 10:
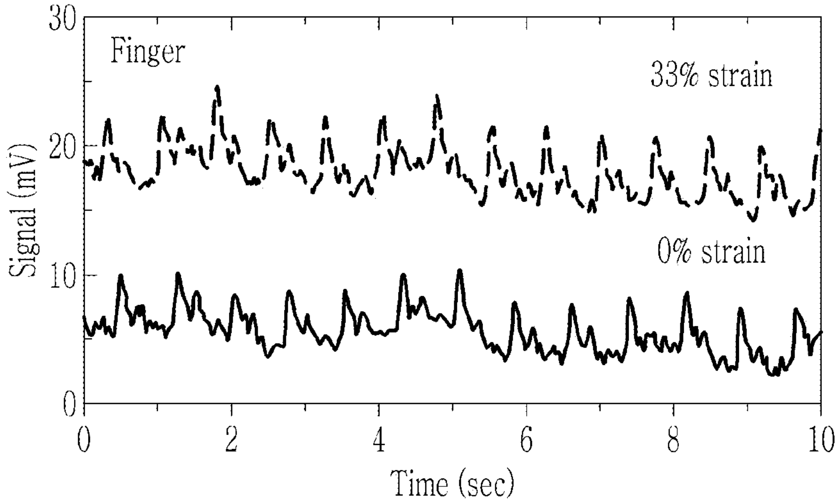
FIG. 10 is a graph showing biological signals (PPG) in a stationary state (0% strain) and biological signals (PPG) in an extended state (33% strain) due to movement after attaching the sensor according to Example 1 to the thumb according to some example embodiments.

The results are shown in FIGS. 9 and 10.

FIG. 9 is a graph showing biological signals (PPG) in a stationary state (0% strain) and biological signals (PPG) in a stretched state (33% strain) with motion after attaching the sensor according to Example 1 near the radial artery of the wrist, and FIG. 10 is a graph showing biological signals (PPG) in a stationary state (0% strain) and biological signals (PPG) in a stretched state (33% strain) with motion after attaching the sensor according to Example 1 to the thumb.

Referring to FIGS. 9 and 10, the biological signals (PPG) in the stationary state (0% strain) and the biological signals (PPG) in the stretched state (33% strain) with motion are substantially equal, which confirms that the sensor of Example 1 exhibits high stretching stability.

While the inventive concepts have been described in connection with what is presently considered to be practical example embodiments, it is to be understood that the inventive concepts are not limited to such example embodiments. On the contrary, the inventive concepts are intended to cover various modifications and equivalent arrangements included within the spirit and scope of the appended claims.

What is claimed is:

1. A sensor, comprising:
- a first electrode and a second electrode, the first electrode and the second electrode each including a conductive polymer and having different work functions from each other, and
- a photoactive layer between the first electrode and the second electrode, the photoactive layer including
  - a first semiconductor and a second semiconductor having different electrical properties from each other, and
  - an elastomer,
- wherein each of an elongation rate of the first electrode, an elongation rate of the second electrode, and an elongation rate of the photoactive layer is greater than about 50%, wherein each respective elongation rate is a percentage of a change in length from an initial length to a breaking point.

2. The sensor of claim 1, wherein each of the elongation rate of the first electrode and the elongation rate of the second electrode is higher than an elongation rate of the conductive polymer.

3. The sensor of claim 2, wherein
- each of the elongation rate of the first electrode and the elongation rate of the second electrode is about 1.2 times to about 10 times higher than the elongation rate of the conductive polymer, and
- the elongation rate of the photoactive layer is about 1.2 times to about 10 times higher than each of an elongation rate of the first semiconductor, an elongation rate of the second semiconductor, or any combination thereof.

4. The sensor of claim 1, wherein
- a work function of the first electrode is shallower than a work function of the conductive polymer, and
- a work function of the second electrode is deeper than the work function of the conductive polymer.

5. The sensor of claim 1, wherein at least one of the first electrode or the second electrode further comprises a polymer additive, the polymer additive different from the conductive polymer.

6. The sensor of claim 5, wherein
- the first electrode comprises a first polymer additive having a shallower work function than a work function of the conductive polymer, and
- the second electrode comprises a second polymer additive having a deeper work function than the work function of the conductive polymer.

7. The sensor of claim 6, wherein the first electrode comprises
- a first layer comprising the conductive polymer, and
- a second layer comprising the first polymer additive, the second layer in contact with the photoactive layer.

8. The sensor of claim 6, wherein the second electrode comprises a mixture of the conductive polymer and the second polymer additive.

9. The sensor of claim 6, wherein the first polymer additive comprises a polymer comprising a substituted or unsubstituted ethyleneimine moiety, a polymer comprising a substituted or unsubstituted fluorene moiety, a polymer comprising a substituted or unsubstituted naphthalene diimide moiety, a copolymer thereof, or any combination thereof.

10. The sensor of claim 6, wherein the second polymer additive comprises a fluorine-containing ionomer.

11. The sensor of claim 6, wherein each of the first electrode and the second electrode further comprises a surfactant.

12. The sensor of claim 1, wherein the conductive polymer comprises PEDOT: PSS or a derivative thereof.

13. The sensor of claim 1, wherein each resistance change rate of the first electrode and the second electrode is each less than about 5% when stretched 100 times at 50% strain.

14. The sensor of claim 1, wherein at least one of the first semiconductor or the second semiconductor is a polymer semiconductor, and the elastomer is styrene-ethylene-butylene-styrene (SEBS), styrene-ethylene-propylene-styrene (SEPS), styrene-butadiene-styrene (SBS), styrene-isobutylene-styrene (SIBS), or any combination thereof.

15. The sensor of claim 1, wherein a content of the elastomer included in the photoactive layer is equal to or greater than a content of the first semiconductor included in the photoactive layer or a content of the second semiconductor included in the photoactive layer.

16. A display panel, comprising:

a stretchable substrate, the sensor of claim 1 on the stretchable substrate, and a light emitting diode on the stretchable substrate.

17. The display panel of claim 16, wherein the stretchable substrate comprises a stretchable region and a non-stretchable region, the sensor is in the stretchable region, and the light emitting diode is in the non-stretchable region.

18. The display panel of claim 17, wherein the stretchable substrate comprises a stretchable polymer, and the non-stretchable region comprises a non-stretchable polymer having an elastic modulus more than 100 times higher than an elastic modulus of the stretchable polymer.

19. An electronic device comprising the display panel of claim 16.

20. An electronic device comprising the sensor of claim 1.

* * * * *